United States Patent
Kikkawa et al.

(12) 
(10) Patent No.: US 6,667,777 B2
(45) Date of Patent: Dec. 23, 2003

(54) LIQUID CRYSTAL DISPLAY DEVICE AND METHOD FOR MANUFACTURING THE SAME

(75) Inventors: Hironori Kikkawa, Tokyo (JP); Muneo Maruyama, Tokyo (JP); Yuji Yamamoto, Tokyo (JP); Mamoru Okamoto, Tokyo (JP); Michiaki Sakamoto, Tokyo (JP)

(73) Assignee: NEC LCD Technologies, Ltd. (JP)

( * ) Notice: Subject to any disclaimer, the term of this patent is extended or adjusted under 35 U.S.C. 154(b) by 65 days.

(21) Appl. No.: 09/927,501

(22) Filed: Aug. 10, 2001

(65) Prior Publication Data

US 2002/0021374 A1 Feb. 21, 2002

(30) Foreign Application Priority Data

Aug. 11, 2000 (JP) ........................................ 2000-245211

(51) Int. Cl.[7] ............................................. G02F 1/1368
(52) U.S. Cl. ........................... 349/38; 349/43; 349/152; 349/187
(58) Field of Search .............................. 349/38, 39, 43, 349/149, 139, 152, 187; 438/30; 257/57, 72

(56) References Cited

U.S. PATENT DOCUMENTS 5,600,461 A * 2/1997 Ueda et al. ................... 349/38
6,040,882 A * 3/2000 Jun et al. ..................... 349/39
6,262,784 B1 * 7/2001 Kim ............................. 349/43

FOREIGN PATENT DOCUMENTS

| JP | 61/029820 | 2/1986 | ........... G02F/1/133 |
| JP | 04-326329 | 11/1992 | ........... G02F/1/136 |
| JP | 10-232412 | 9/1998 | ........... G02F/1/136 |
| JP | 10-268357 | 10/1998 | ........... G02F/1/136 |
| JP | 2933879 | 5/1999 | ........... G02F/1/136 |

* cited by examiner

*Primary Examiner*—Kenneth Parker
*Assistant Examiner*—Tai Duong
(74) *Attorney, Agent, or Firm*—Hayes Soloway P.C.

(57) ABSTRACT

A liquid crystal display device having a switching device with a first electrode connected to the scanning line to become a gate, a second electrode connected to the signal line to become a drain or a source, a third electrode connected to the pixel electrode to become the source or the drain and switching the display signal to feed the corresponding pixel electrode by the scanning signal; and an electrode for an auxiliary capacitor, located in a place opposite to the pixel electrode to define the auxiliary capacitor. Further, the second and third electrodes are formed in a layer different from the first electrode, the pixel electrode is formed in top of the first, second, and third electrodes, and the electrode for an auxiliary capacitor is formed on the same layer as the first electrode.

10 Claims, 19 Drawing Sheets

A - A section

B - B section

C - C section

P - P section

Q - Q section

R - R section

S - S section

209; transparent insulation substrate

203; scanning line
209

202; transparent pixel electrode

301; TFT substrate

401; TFT substrate

LIQUID CRYSTAL DISPLAY DEVICE AND METHOD FOR MANUFACTURING THE SAME

The present application claims priority of Japanese Patent Application No. 2000-245211 filed on Aug. 11, 2000, which is hereby incorporated by reference.

BACKGROUND OF THE INVENTION

1. Field of the Invention

The present invention relates to a liquid crystal display device and a method for manufacturing the same.

2. Description of the Related Art

Conventionally, a liquid crystal display device equipped with a liquid crystal display panel has been applied to a wide range of display devices such as a TV monitor, a display apparatus for an OA (Office Automation) instrument, and a like.

The liquid crystal display panel is assembled by fixing a thin film transistor substrate (hereafter, may be referred to as a TFT substrate,) in which a thin film transistor (TFT) is formed, and an opposite substrate, in which a color filter is formed, in an opposite position through a space with some micrometers distance and a liquid crystal is sealed in this space.

FIG. 21 is a plan view showing a structure of one pixel of the TFT substrate of the conventional liquid crystal display panel, FIG. 22 is a sectional view along with the P—P line of FIG. 21, and FIG. 23 is the sectional view along with a P—P line of FIG. 21.

In a TFT substrate 101, as shown in FIG. 21, surrounding a transparent pixel electrode 102 arranged in a matrix pattern, each scanning line 103 to supply a scanning signal and each signal line 104 to supply a display signal are made to cross each other.

The TFT 101a (FIG. 23) is arranged around each crossing place of the scanning line 103 and the signal line 104 and used as a switching device, which applies a signal charge to a liquid crystal cell corresponding thereto by connecting a source electrode thereof to the transparent pixel electrode 102. In the TFT 101a, a scanning signal is input to a gate electrode 105, to which the scanning line 103 is connected, through the scanning line 103, and actuation and control are operated by inputting a display signal (data signal) in a drain electrode 106 to which the signal line 104 is connected.

A liquid crystal capacitor (condenser) made by interposing liquid crystal between the transparent pixel electrode 102 of the TFT substrate 101 and an opposite electrode (common electrode) of an opposite substrate has a charge (even while the TFT 101a is turned OFF) corresponding to a signal to work the liquid crystal.

In order to reinforce electric charging performance of the liquid crystal capacitor and reduce an electric potential variability of the transparent pixel electrode 102, an auxiliary capacitor is prepared in parallel to the liquid crystal capacitor. Namely, as shown in FIG. 21 to FIG. 23, a auxiliary capacitor common electrode 108, for example, is made, a auxiliary capacitor opposite electrode 109 is formed on a top part of the auxiliary capacitor common electrode 108 through a gate insulation film 110, the auxiliary capacitor opposite electrode 109 is connected to the source electrode 107 through a connecting electrode 111, and the auxiliary capacitor opposite electrode 109 is connected to the transparent pixel electrode 102 in a contact hole K1.

FIGS. 24A to 24F are process charts to explain a method for manufacturing this conventional liquid crystal display panel.

For preparation of the TFT substrate 101, first, as shown in FIG. 24A, chromium film is formed on a transparent insulation substrate 112 and patterning is carried out to form the gate electrode 105.

Subsequently, as shown in FIG. 24B, a silicon nitride film is formed on a whole surface, the gate insulation film 110 is formed, and the semiconductor layer 113 is formed by using amorphous silicon not doped and amorphous silicon made in a $n^+$ type by doping impurities.

Next, as shown in FIG. 24C, chromium film is formed on the surface of the semiconductor layer 113 and a near place thereof and patterning is carried out to form the source electrode 107 and the drain electrode 106.

Next, as shown in FIG. 24D, the auxiliary capacitor opposite electrode 109 and the connecting electrode 111 are formed by using ITO (Indium Tin Oxide,) followed by, as shown in FIG. 24E, formation of the silicon nitride film and patterning is carried out to form a passivation film 114.

Next, as shown in FIG. 24F, a transparent acryl polymer is patterned and an overcoat layer 115 is formed on the passivation film 114.

Next, in the top of a central part of a pixel of the auxiliary capacitor common electrode 108, the passivation film 114 and the overcoat layer 115 are etched to the contact hole K1 (FIG. 21) and then, the ITO film is formed on the overcoat layer 115 to carry out patterning finally resulting in the transparent pixel electrode 102.

A structure and method of the TFT substrate as described above (hereinafter, referred to as the first conventional art) have been disclosed in, for example, Japanese Patent No. 2933879.

FIG. 25 is a plan view for showing a structure of one pixel of a TFT substrate of another conventional liquid crystal display panel, FIG. 26 is a sectional view along with a line R—R of FIG. 25, and FIG. 27 is a sectional view along with a line S—S of FIG. 25.

In the above described first conventional art, the auxiliary capacitor common electrode 108 is made and hence, an aperture ratio of the pixel reduces. On the other hand, the following art (hereafter, the second conventional art) has been proposed: the auxiliary capacitor common electrode 108 is not made and, as shown in FIG. 25 to FIG. 27, a auxiliary capacitor opposite electrode 208 is made on top of a scanning line 203 of a preseding stage though a gate insulation film 210, the gate insulation film 210 is interposed between scanning line 203 and auxiliary capacitor opposite electrode 208 to make a auxiliary capacitor for preparation of a TFT substrate 201.

To a gate electrode 205 of a TFT 201a, the scanning line 203 is connected and to a drain electrode 206, a signal line 204 is connected.

Where, a transparent pixel electrode 202 is connected to the auxiliary capacitor opposite electrode 208 in a contact hole K2 and connected to a source electrode 207 in a contact hole K3.

FIGS. 28A to 28F are process charts showing places corresponding to those of FIG. 26, and FIGS. 29A to 29F are process charts showing places corresponding to those of FIG. 27.

For preparation of the TFT substrate 201, first as shown in FIG. 29A and FIG. 28A, a transparent insulation substrate 209 is prepared and, as shown in FIG. 29B and FIG. 28B, a chromium film is formed on the transparent insulation substrate 209 and patterning is carried out to form the gate electrode 205 and the scanning line 203.

Next, as shown in FIGS. 29C and 28C, the silicon nitride film is formed on the entire surface and patterning is carried out to form the gate insulation film 210 and as shown FIG. 29C, a semiconductor layer 211 is formed by using amorphous silicon not doped and amorphous silicon made to the $n^+$ type by doping.

Next, as shown in FIGS. 29D and 28D, the source electrode 207 and the drain electrode 206 are formed on the semiconductor layer 211 and also, the signal line 204 and the auxiliary capacitor opposite electrode 208 are formed.

Next, as shown in FIG. 28E, the silicon nitride is formed and patterning is carried out to form a passivation film 212.

Next, as shown in FIG. 29F and FIG. 28F, transparent acryl polymer is patterned and an overcoat layer 213 is formed on the passivation film 212 and then, in a point of connecting the transparent pixel electrode 202 to the source electrode 207 and in the point of connecting the transparent pixel electrode 202 to the auxiliary capacitor opposite electrode 208, the passivation film 212 and the overcoat film 213 are etched, the contact holes K2 and K3 are formed, and the ITO film is formed on the overcoat film 213 and patterning is carried out to form the transparent pixel electrode 202

However, in the above described first conventional art, in order to increase aperture ratio, the auxiliary capacitor common electrode 108 as a light blocking member must be formed in a thin shape and in order to increase the auxiliary capacitor, a region, where the auxiliary capacitor common electrode 108 as the electrode of the auxiliary capacitor overlaps on the auxiliary capacitor opposite electrode 109, must be increased. Therefore, in consideration of these requirements, the auxiliary capacitor opposite electrode 109 is located in a place near both the signal line (drain wire) 104 and hence, between the drain electrode 106 and the source electrode 107 to which the auxiliary capacitor opposite electrode 109 has been connected, a short is caused which is a major weakness in the first conventional art.

Also, in the step of forming the electrode and the insulation film on the substrate, many projected and recessed structures are formed. For example, after the chromium film is formed on the semiconductor layer 113 and patterning is carried out to form the source electrode 107 and the drain electrode 106, the ITO film is formed and patterning is carried out to form the transparent pixel electrode 102 and thus, in patterning of the ITO film, a defect pattern is easy to make, a short is caused between electrodes and between wires, and a point defect is easily caused which are major weaknesses in the first conventional art.

Also, in order to form the contact hole K1, in etching silicon nitride composing the passivation film 114 and the overcoat layer 115, immediately beneath the place where the contact hole K1 has been formed, the auxiliary capacitor opposite electrode 109 the gate insulation film 110, and the auxiliary capacitor common electrode 108, are layered and thus, an etchant for etching silicon nitride penetrates the gate insulation film 110 through a pin hole as a defect, for example, of the auxiliary capacitor opposite electrode 109 to cause the defect in the gate insulation film resulting in occurrence of leak of an electric current and a short of the auxiliary capacitor opposite electrode 109 and the auxiliary capacitor common electrode 108 (that is, a short of the source electrode 107 connected to the auxiliary capacitor opposite electrode 109 and the auxiliary capacitor common electrode 108; these are additional major weaknesses in the first conventional art.

On the other hand, in the above described second conventional art, there are required two contact holes K2 and K3 and therefore, a bad connection in even one contact hole K2 (K3) causes decrease in a yield due to the point defect which is a major weaknesses in the second conventional art.

Also, in order to form the contact hole K2 (K3,) in etching silicon nitride to constitute the passivation film 212 and the overcoat layer 213, immediate beneath the place where this contact hole K2 has been formed, the auxiliary capacitor opposite electrode 208, the gate insulation film 112, and the scanning line 203 of the preseding stage are layered and thus, the etchant penetrates the gate insulation film 210 through, for example, the pin hole of the auxiliary capacitor opposite electrode 208 to cause the defect in the gate insulation film resulting in a short of the auxiliary capacitor opposite electrode 208 and the scanning line 203 which is an additional weakness in the second conventional art. Therefore, in order to prevent a short caused immediately beneath the contact hole K1 in the first conventional art, as shown in FIG. 30, an art hereafter, a third conventional art in which a width of the place around connection of a connecting electrode 302 to the auxiliary capacitor opposite electrode 109 is increased, a contact hole K4 is made in a position with a distance from the place just above this auxiliary capacitor common electrode 108 to form a TFT substrate 301 and an art (hereafter, a fourth conventional art) in which in order to prevent a short immediately beneath the contact hole K2 in the second conventional art, as shown in FIG. 31, the auxiliary capacitor opposite electrode 208 is widened and a contact hole K5 is made in the place with the distance from the position immediately above the scanning line 203 to form a TFT substrate 401 have been proposed.

However, an orientation of the liquid crystal in the position of the contact hole K4 (K5) is disordered by a difference in a height of the contact hole K4 (K5) to cause lowering of contrast. Therefore, the place around the contact hole K4 (K5) must be shielded from light.

In the case of the first and second arts, shielding could be succeeded by using a metal wire; however, in case of the third and fourth arts, the auxiliary capacitor opposite electrode 109, the auxiliary capacitor opposite electrode 208, and the connecting electrode must be metallized or shielded by the opposite substrate to shield additionally the place around the contact hole K4 (K5) additionally from the light resulting in reduction of aperture ratio which is a major weakness in the third conventional art and the fourth conventional art.

SUMMARY OF THE INVENTION

In view of the above, it is an object of the present invention to provide a liquid crystal display device having a high reliability, which can suppress deterioration of a yield caused by a short electrodes, keeping enough aperture ratio, and an auxiliary capacitor, and a method for the manufacturing same.

According to a first aspect of the present invention, there is provided a liquid crystal display device including:

a scanning line to supply a scanning signal;

a signal line to supply a display signal;

a pixel electrode to apply a voltage to a liquid crystal layer;

a switching device containing a first electrode formed on a place near a crossing part of the scanning line with the signal line and connected to the scanning line to become a gate, a second electrode connected to the signal line to become a drain or a source, a third electrode connected to the pixel electrode to become a source or a drain and switching the display signal to feed the corresponding pixel electrode by the scanning signal;

an electrode for an auxiliary capacitor, located in a place opposite to the pixel electrode to define the auxiliary capacitor;

wherein in a same pixel, the second electrode and the third electrode are formed in a layer different from the first electrode through a first insulation film, the pixel electrode is formed in top of the first electrode, second electrode, and third electrode through a second insulation film, the electrode for an auxiliary capacitor, is formed in the same layer as the first electrode and is electrically connected to an adjacent scanning line.

In the foregoing, a preferable mode is one wherein the electrode for the auxiliary capacitor is made up of a transparent conductive material.

Also, a preferable mode is one wherein the electrode for the auxiliary capacitor is formed from the same material as that of the first electrode.

Also, a preferable mode is one wherein the electrode for the auxiliary capacitor is formed avoiding overlay on the signal line.

Also, a preferable mode is one wherein the scanning line and the signal line are formed by using aluminium or an aluminium alloy and terminal portions of the scanning line and signal line are used as signal input terminals.

According to a second aspect of the present invention, there is provided a method for manufacturing the liquid crystal display device, including:

a first step of forming a scanning line, a first electrode, which becomes a gate by connecting to the scanning line, and an electrode for the auxiliary capacitor by patterning after making a conductive film on a transparent insulation substrate;

a second step of forming an island semiconductor layer opposite to the first electrode through the first insulation film;

a third step of forming a signal line and also a second electrode to become a drain or source and a third electrode to become a source or drain which are connected to the signal line with a distance on the semiconductor layer;

a fourth step of forming a second insulation film on a top of the semiconductor layer, the second electrode, and the third electrode;

a fifth step of forming an opening on the second insulation film to reach the third electrode and form a pixel electrode connecting to the third electrode through the opening; wherein the electrode for the auxiliary capacitor and the pixel electrode are overlaid for forming the auxiliary capacitor.

In the foregoing second aspect, a preferable mode is one wherein in the first step, the first electrode and the electrode for the auxiliary capacitor are formed by using a same kind of conductive material.

Also, a preferable mode is one wherein the first step includes a step of forming the first electrode using the conductive material and the step of forming the first electrode for the auxiliary capacitor using the transparent conductive material.

Also, a preferable mode is one wherein in the first step, after formation of the scanning line, the electrode for the auxiliary capacitor is formed by using the transparent conductive material and also a terminal portion of the scanning line is covered with the conductive film using the transparent conductive material to form a signal input terminal.

Further, a preferable mode is one wherein in the first step, the electrode for the auxiliary capacitor is formed by using the transparent conductive material and also the conductive film is formed in a region, where the signal line is formed, by using the transparent conductive material;

in the third step, in the terminal portion, the signal line is formed to connect to the conductive film to form the signal input terminal.

Still further, a preferable mode is one wherein in the first step and the third step, the scanning line and the signal line are formed by using aluminium or an aluminium alloy and a surface of the terminal portions of the scanning line and signal line are exposed to make the signal input terminals.

With the above configurations, for example, even if in the case where the transparent auxiliary capacitor-forming electrode is formed avoiding overlaying on the third electrode and the contact hole is formed in the connecting place to connect the third electrode to the pixel electrode, immediate beneath the contact hole, the electrode layers are not layered above each other and thus, electrodes do not cause shorts.

Consequently, yield can be improved, and the liquid crystal display device of high quality can be provided.

In addition, simultaneously, enough aperture ratio can be kept and also the pixel electrode and the auxiliary capacitor electrode can receive the relatively large area to allow the relatively large capacitance to be kept.

BRIEF DESCRIPTION OF THE DRAWINGS

Other objects, features, and advantages of the present invention will become more apparent from the following detailed description when read in conjunction with the accompanying drawings, in which.

DESCRIPTION OF THE PREFERRED EMBODIMENT

Best modes for carrying out the present invention will be described in further detail using various embodiments with reference to the accompanying drawings.

First Embodiment

Figure 1:
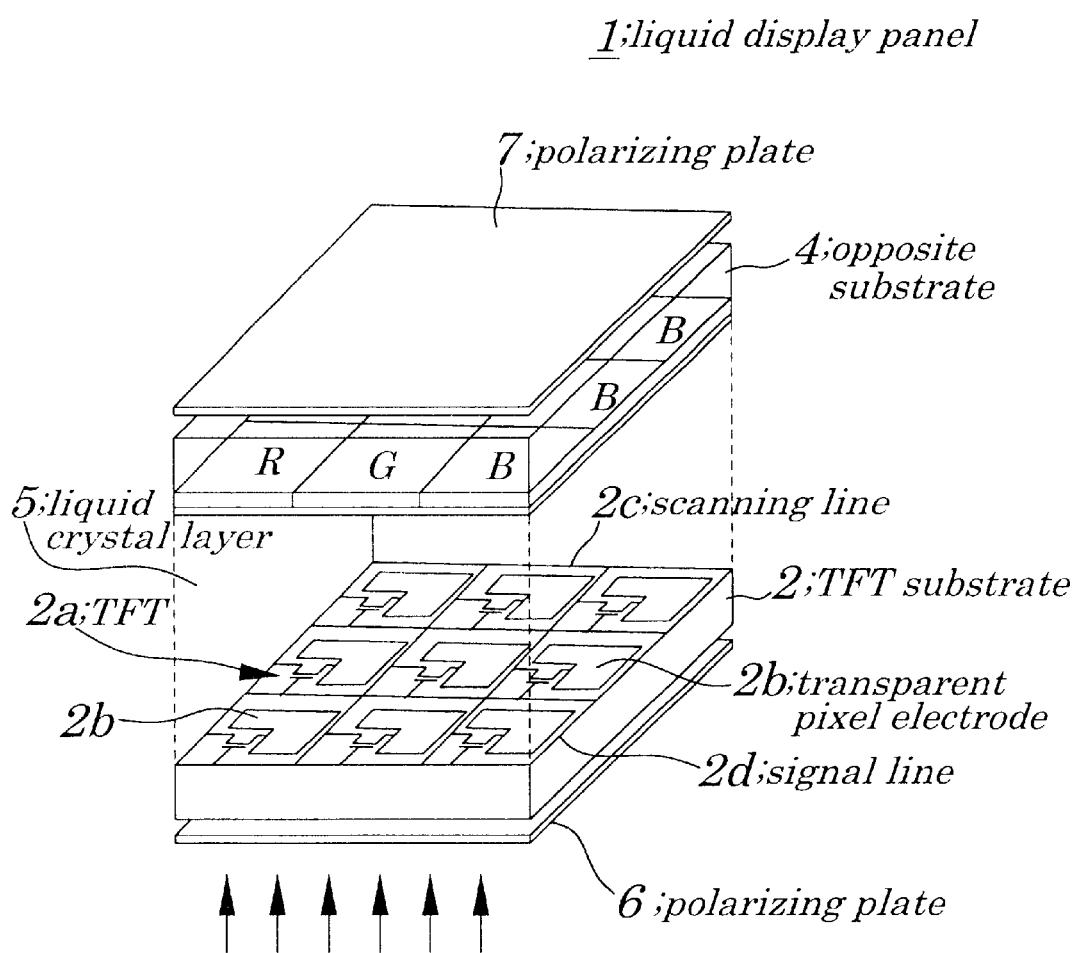
FIG. 1 is a perspective side view showing schematically a configuration of a liquid crystal display panel according to a first embodiment of the present invention.
Figure 2:
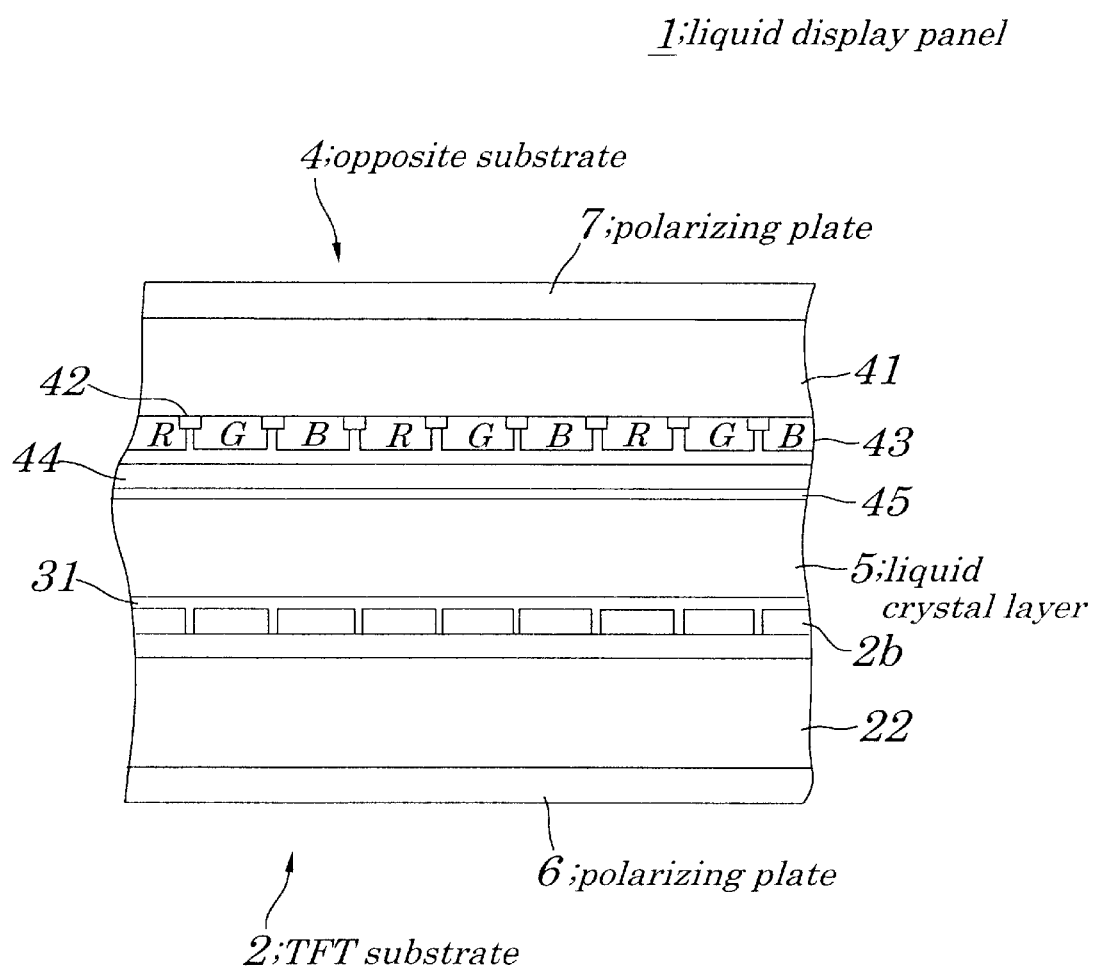
FIG. 2 is a sectional view showing diagrammatically the configuration of the liquid crystal display panel.
Figure 3:
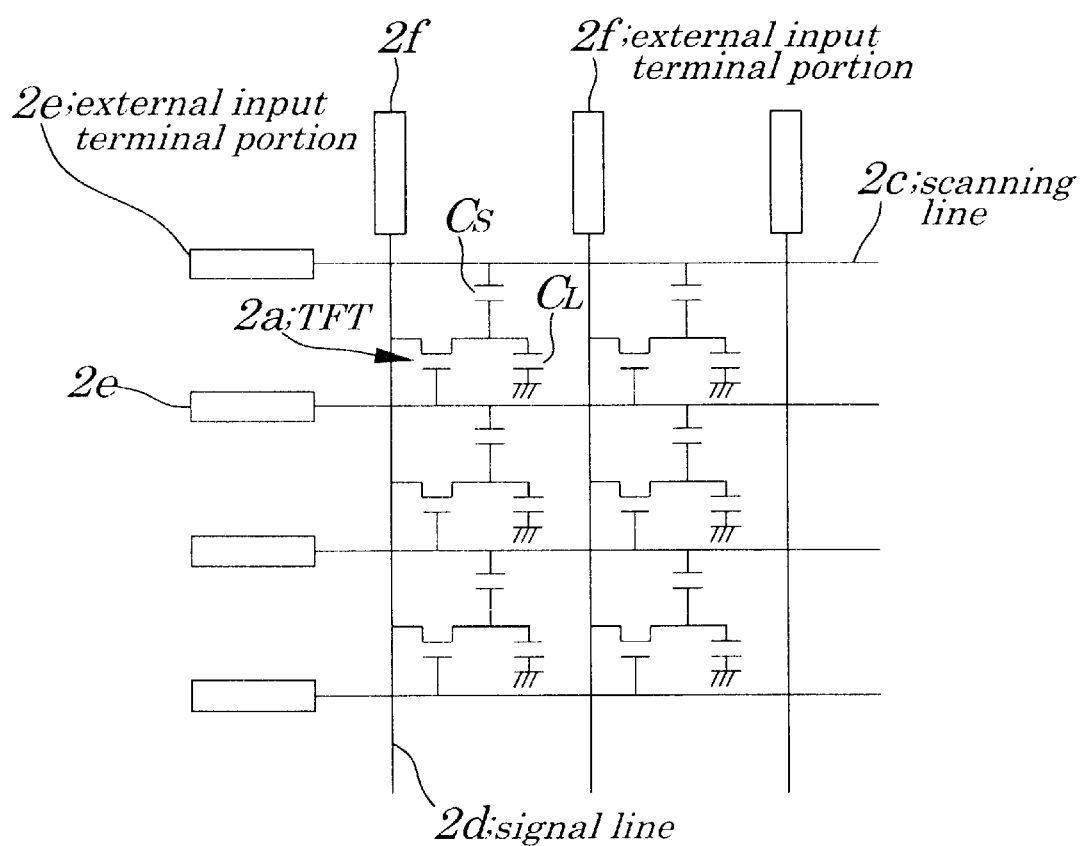
FIG. 3 is a figure of an equivalent circuit showing an electric constitution of the liquid crystal display panel.
Figure 4:
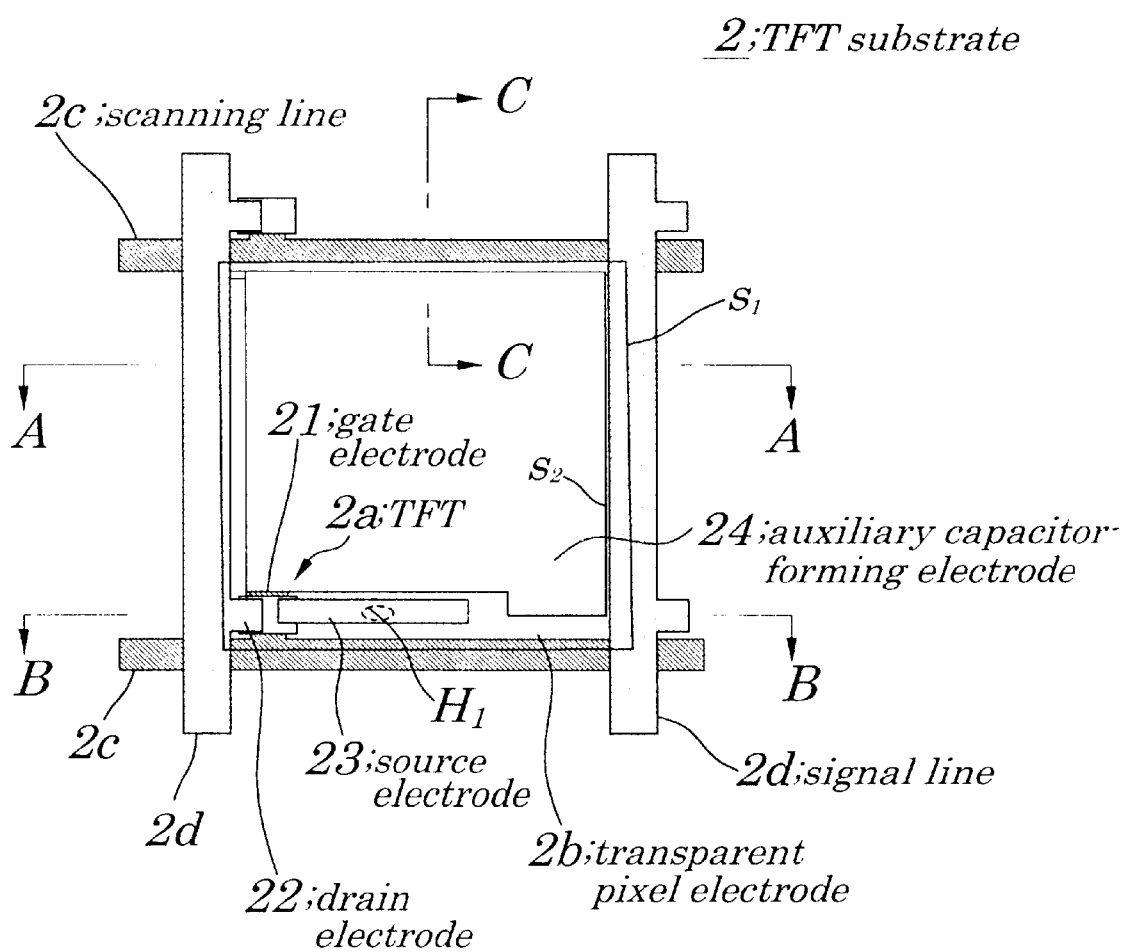
FIG. 4 is a plan view showing a configuration of one pixel of a TFT substrate of the liquid crystal display panel.
Figure 5:
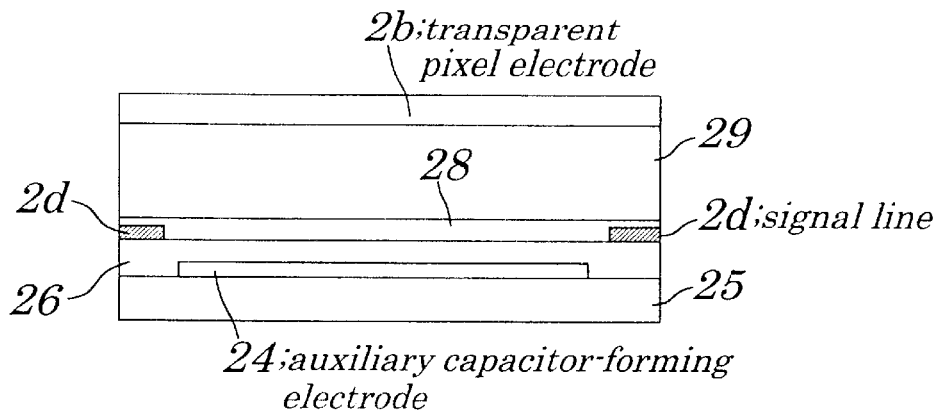
FIG. 5 is a sectional view along with a line A—A of FIG. 4.
Figure 6:
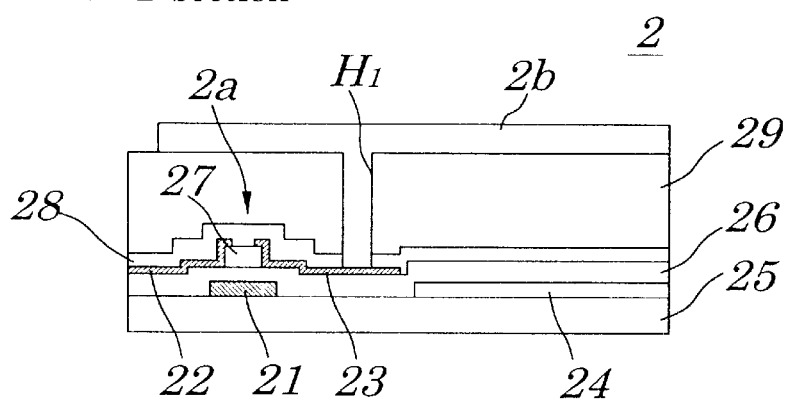
FIG. 6 is a sectional view along with a line B—B of FIG. 4.
Figure 7:
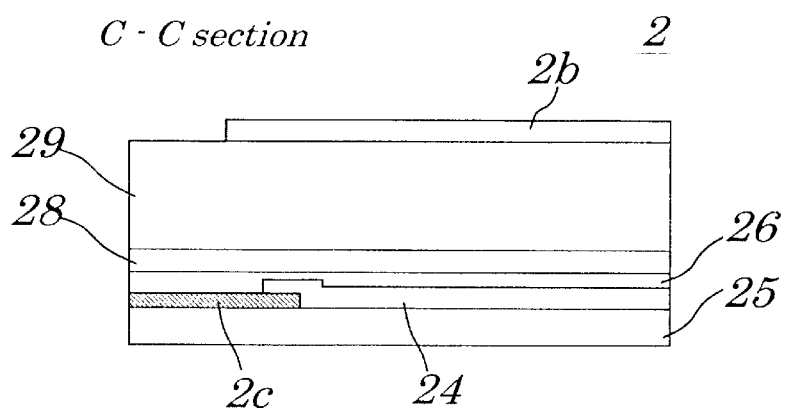
FIG. 7 is a sectional view along with a line C—C of FIG. 4.
Figure 8:
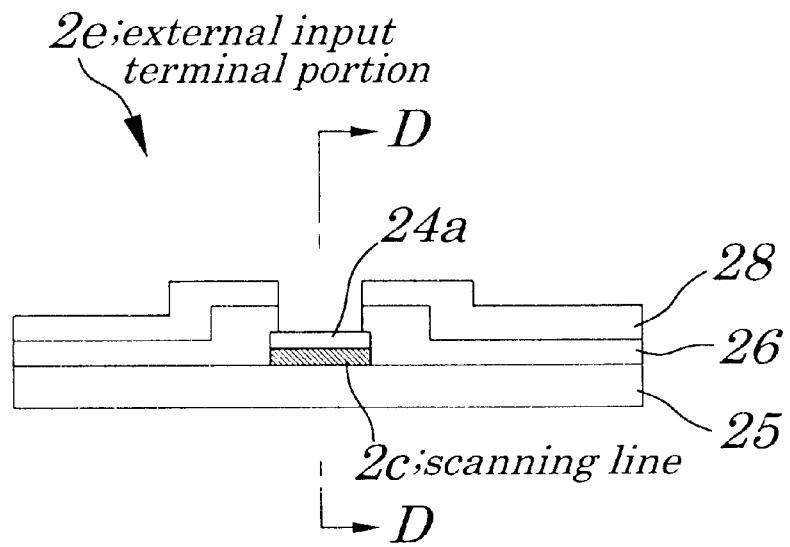
FIG. 8 is a transverse sectional view showing a configuration of an external input terminal portion for inputting a scanning signal of the liquid crystal display panel.
Figure 9:
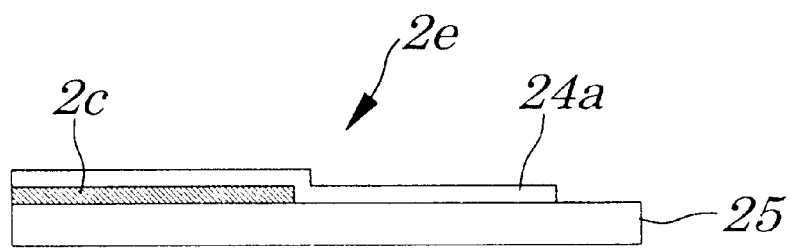
FIG. 9 is a sectional view along with line a D—D of FIG. 8.
Figure 10:
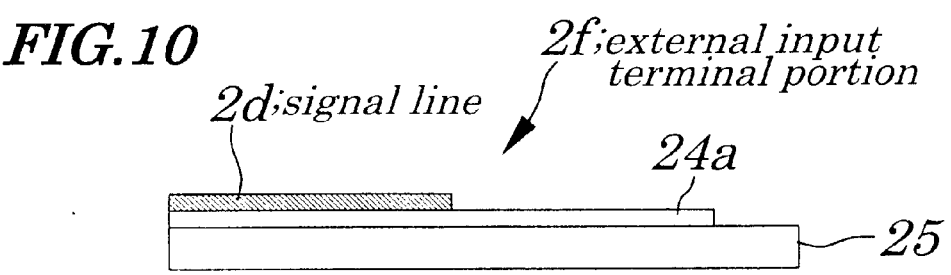
FIG. 10 is a longitudinal view showing a configuration of the external input terminal portion for inputting a display signal of liquid crystal display panel.

FIG. 1 is a perspective side view showing schematically a configuration of a liquid crystal display panel 1 according to a first embodiment of the present invention; FIG. 2 is a sectional view showing diagrammatically the configuration of the same liquid crystal display panel; FIG. 3 is a figure of an equivalent circuit showing an electric constitution of the same liquid crystal display panel; FIG. 4 is a plan view showing a configuration of one pixel of a TFT substrate of the same liquid crystal display panel; FIG. 5 is a sectional view along a line A—A of FIG. 4; FIG. 6 is the sectional view along a line B—B of FIG. 4; FIG. 7 is the sectional view along line C—C of FIG. 4; FIG. 8 is a transverse sectional view showing a configuration of an external input terminal portion for inputting a scanning signal of the same liquid crystal display panel; FIG. 9 is the sectional view along a line D—D of FIG. 8; FIG. 10 is a longitudinal view showing the configuration of the external input terminal portion for inputting a display signal of the same liquid crystal display panel; FIGS. 11A to 11G are process charts for explaining of a method for manufacturing the same liquid crystal display panel; and FIGS. 12A to 12D are process charts for explaining of a method for formation of the external input terminal portion for inputting the same scanning signal.

The liquid crystal display panel 1 according to this example is, as a rule, a transmission-type TFT panel and as shown in FIG. 1 and FIG. 2, has a TFT substrate 2 on which a TFT 2a is formed, opposite substrates 4 fixed in direction opposite each other through a space having a distance of some micrometers (for example, 5 $\mu$m) from the TFT substrate 2, a liquid crystal layer 5 sealed in the above described, and a pair of polarizing plates 6, 7 arranged outside the TFT substrate 2 and the opposite substrates 4.

On the TFT substrate 2, as shown in FIG. 1, FIG. 3 and FIG. 4, a plurality of the transparent pixel electrodes 2b, 2b, . . . are arranged in a matrix pattern and each scanning line (gate wire) 2c to supply scanning signal and each signal line 2d to supply the display signal are formed so as to cross each other around the transparent pixel electrodes 2b, 2b, . . . . The above described scanning signal and display signal are input from an external input terminal portion 2e and an external input terminal portion 2f connected to an external circuit, respectively.

Each scanning line 2c and signal line 2d are, as shown in FIG. 4, a part thereof is located in a position over an outer circumferential part of the transparent pixel electrode 2b, 2b, . . . .

The TFT 2a is arranged adjacent to each place where the scanning line 2c crosses the signal line 2d and is used as a switching device to apply a signal charge (a signal voltage) to a liquid crystal cell corresponding to by connecting the source electrode thereof to the transparent pixel electrode 2b. The TFT 2a is actuated and controlled by inputting the scanning signal in a gate electrode 21, to which the scanning line 2c is connected, through the scanning line 2c and also by inputting the display signal (data signal) in a drain electrode 22, to which the signal line 2d is connected.

On the other hand, a source electrode of the TFT 2a is connected to the transparent pixel electrode 2b through a contact hole $H_1$.

Further, as shown in FIG. 3, in parallel to a liquid crystal capacitor $C_L$, that is formed by interposing the liquid crystal layer 5 between the TFT substrate 2 and the opposite substrates 4, an auxiliary capacitor $C_S$ is formed and the transparent pixel electrode 2b together with a transparent auxiliary capacitor-forming electrode 24 configures both electrodes of this auxiliary capacitor $C_S$. On the other hand, the auxiliary capacitor-forming electrode 24 is electrically connected just before scanning line 2c.

As shown in FIG. 4, a region, where the transparent auxiliary capacitor-forming electrode 24 shown by an outline line $S_2$ is formed, overlaps with a large part of the region, where the transparent pixel electrode 2b shown by an outline line $S_1$ is formed, and both regions have almost same area. In other words, the transparent pixel electrode 2b and the transparent auxiliary capacitor-forming electrode 24 have larger areas than those of conventional examples.

Where, for example, a pixel of a size of 100 ($\mu$m)×300 ($\mu$m) will be considered below.

In assumption of a relative dielectric constant of the liquid crystal to about seven, a thickness of the liquid crystal layer 5 of about 5 μm, and the area of the transparent pixel electrode 2b to 22000×10⁻¹² m², the liquid crystal capacitor $C_L$ is calculated as 7 $\in_o$[F/m]×22000×10⁻¹²[m²]/5 [μm]– 30800 [μm]×$\in_o$[F/m]. Where, $\in_o$ is the dielectric constant in a vacuum and $\in_o$=8.854×10⁻¹²[F/m].

As a common example, between the transparent pixel electrode 2b and the auxiliary capacitor-forming electrode 24, as described later, the gate insulation film 26 consisting essentially of an approximate 0.5 μm-thick silicon nitride, a passivation film 28 consisting essentially of an approximate 0.1 μm-thick silicon nitride, and the overcoat layer consisting of an approximate 3 μm-thick acryl layer are layered. The relative dielectric constant of silicon nitride is about six and the relative dielectric constant of acryl resin is about three and hence, if it is assumed that the auxiliary capacitor is ½ (15400 [μm]×$\in_o$[F/m]) of the liquid crystal capacitor, a necessary area of the transparent auxiliary capacitor-forming electrode 24 is calculated as 15400 [μm]×$\in_o$[F/m] {(0.5 [μm]/6 $\in_o$[F/m])+(0.1 [μm]/6 $\in_o$[F/m])+(3 [μm]/3 $\in_o$[F/m])}=15400 [μm]×1.1 [μm]=16940×10⁻¹² [m²].

The area of the transparent auxiliary capacitor-forming electrode 24 can be satisfactorily implemented in consideration of the constitution of this first embodiment.

The contact hole $H_1$ is, as shown in FIG. 6, formed in a place other than a region where the gate electrode 21 and the transparent auxiliary capacitor-forming electrode 24 are formed.

The TFT substrate 2 has, as shown in FIG. 5 to FIG. 7, a structure in which each electrode, the insulation film, and a like are layered on the transparent insulation substrate (panel substrate) 25. In other words, upon the transparent insulation substrate 25, the gate electrode 21 and the transparent auxiliary capacitor-forming electrode 24 are formed on the same layer, the gate electrode 21 and the auxiliary capacitor-forming electrode 24 are covered with an insulation film 26, a semiconductor layer 27 is formed on the insulation film 26 on the top of the gate electrode 21, a source electrode 23 and the drain electrode 22 are formed on the insulation film 26 contacting the semiconductor layer 27, the insulation film 26, the semiconductor layer 27, the source electrode 23, and the drain electrode 22 are covered with the passivation film 28, an overcoat layer 29 is formed on the passivation film 28, and the overcoat layer 29 is covered with the transparent pixel electrode 2b. For reference, as shown in FIG. 5, the signal line 2d is formed to avoid overlapping with the transparent auxiliary capacitor-forming electrode 24 to keep a distance of a predetermined distance or longer.

The external input terminal portion 2e has, as shown in FIG. 8 and FIG. 9, the scanning line 2c consisting of chromium and a conductive layer 24a covering over the scanning line 2c and in the external input terminal portion 2e, the insulation film 26 and the passivation film 28, that have been layered on the top of the conductive layer 24a, are opened to expose a surface of the conductive layer 24a.

The conductive layer 24a is connected to a TCP (Tape Carrier Package,) on which a liquid crystal actuating IC, for example, is formed, through an anisotropic conductive film showing conductivity restricted in a direction of the thickness by crimping. Where, as a material of the conductive layer 24a, the ITO, having a relatively high plasticity, of which contact resistance to the anisotropic conductive film in crimping can be made relatively small and material is same as that of the transparent auxiliary capacitor-forming electrode 24 and the transparent pixel electrode 2b, is used.

The external input terminal portion 2f has, as shown in FIG. 10, the conductive layer 24a made of ITO and the signal line 2d consisting of chromium and covering over the conductive layer 24a other part than a distal part and also in this external input terminal portion 2f, similar to the external input terminal portion 2e, the gate insulation film 26 and the passivation film 28, that have been layered on the top of the conductive layer 24a, are opened to expose the surface of the conductive layer 24a.

The conductive layer 24a in the external input terminal portion 2e and 2f are simultaneously prepared in the step to form the transparent auxiliary capacitor-forming electrode 24.

In addition, on the transparent pixel electrode 2b, as shown in FIG. 2, a liquid crystal orientating film 31 is formed to cover the transparent pixel electrode 2b.

On the opposite substrate 4, colored layers 43 of red R, green G, and blue B are mosaically, for example, arranged by partitioning by a black matrix 42 on a transparent insulation substrate 41 and an opposite substrate 4 is formed to cover the colored layers 43. In addition, on the opposite substrate 4, the liquid crystal orientating film 45 is formed to cover the opposite substrate 4.

The TFT substrate 2 and the opposite substrate 4 are arranged to be located in an opposite position of the liquid crystal orientating film 31 to the liquid crystal orientating film 45 and between the liquid crystal orientating film 31 and the liquid crystal orientating film 45, the liquid crystal layer 5 is interposed.

Next, referring to FIGS. 11A to 11G and FIGS. 12A to 12D, a method for manufacturing the liquid crystal display panel of this example will be described below. For reference, FIGS. 12A to 12D show respectively a region where a distal part, that is, the external input terminal portion 2e, of the scanning line 2c is formed.

First, the method for preparation of the TFT substrate 2 will be described below.

Figure 11A:
FIGS. 11A to 11G are process charts for explaining of a method for manufacturing the liquid crystal display panel.
Figure 11B:
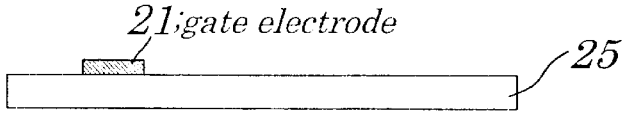
Figure 12A:
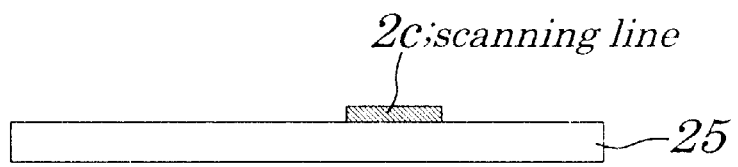
FIGS. 12a to 12D are process charts for explaining of a method for formation of the external input terminal portion for inputting the scanning signal.

First of all, as shown in FIG. 11A, the transparent insulation substrate 25 is prepared, chromium film is formed on this the transparent insulation substrate 25 by a sputtering method, patterning is carried out by employing photolithography, and as shown in FIG. 11B, the gate electrode 21 is formed and simultaneously, as shown in FIG. 12A, the scanning line 2c is formed.

Figure 11C:
Figure 12B:
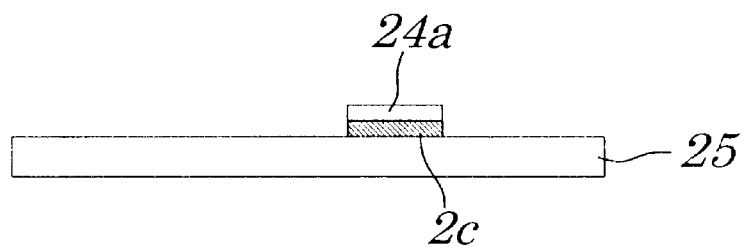

Next, by photolithography, the ITO is patterned on the transparent insulation substrate 25 and, as shown in FIG. 11C, the transparent auxiliary capacitor-forming electrode 24 is formed and simultaneously, as shown in FIG. 12B, the conductive layer 24a. In this occasion, in the region where the external input terminal portion 2e of the distal part of the signal line 2d is formed, the conductive layer 24a is formed (refer to FIG. 10.)

Figure 11D:
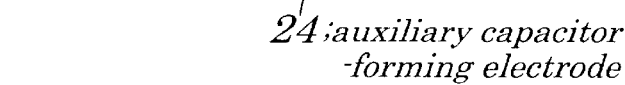
Figure 12C:
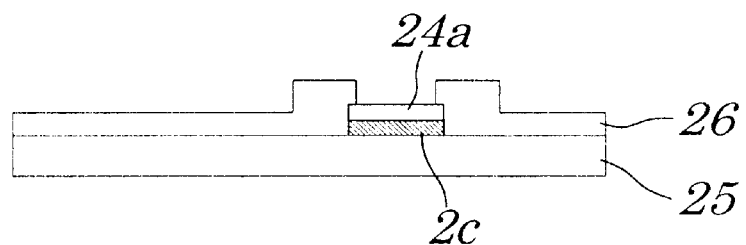

Next, as shown in FIG. 11D and FIG. 12C, by chemical vapor deposition method (CVD method,) the silicon nitride film is formed on an entire surface to form the gate insulation film 26. As shown in FIG. 12C, in the place where the external input terminal portion 2e is formed, the surface of the scanning line 2c is exposed by opening.

Next, the amorphous silicon film not doped (hereafter, a-Si) and the amorphous silicon film made in a n⁺ type by doping (hereafter, n⁺ type a-Si) are continuously formed by the CVD method and subjected to patterning to form the semiconductor layer 27. For reference, the n⁺ type a-Si film is formed to keep ohmic contact of the source electrode 23 and the drain electrode 22 to the a-Si layer.

Figure 11E:
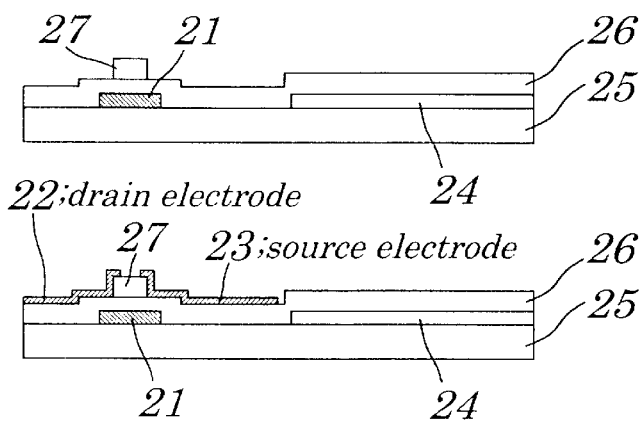

Next, as shown in FIG. 11E, the chromium film is formed on the semiconductor layer 27 by the sputtering method and this chromium film is subjected to the sputtering method to form the source electrode 23 and the drain electrode 22.

Simultaneously, the signal line 2d is formed by using the chromium film. In the place where the external input terminal portion 2e is formed, the signal line 2d is formed on the conductive layer 24a (refer to FIG. 10.)

Next, by using a gas system for etching the $n^+$ type a-Si, dry etching is carried out to remove the $n^+$ type a-Si between the source electrode 23 and the drain electrode 22. For reference, this step is carried out to prevent a flow of an electric current directly across the source electrode 26 and the drain electrode 27 through the $n^+$ type a-Si.

Figure 11F:
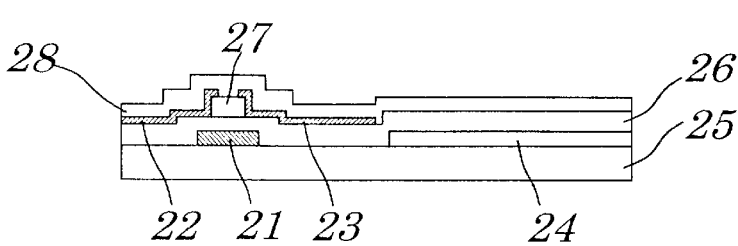
Figure 12D:
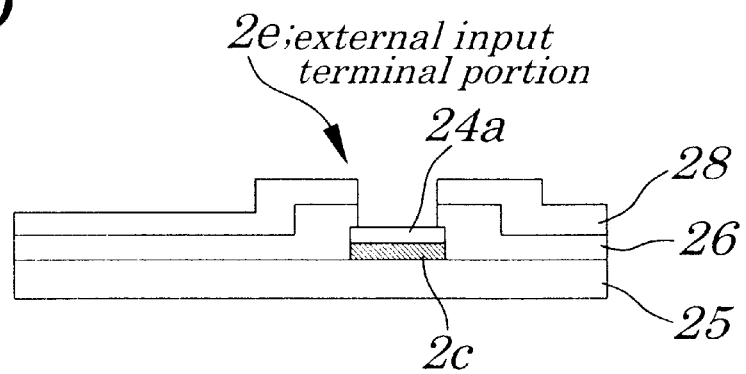

Next, as shown in FIG. 11F and FIG. 12D, the silicon nitride film is formed by the CVD method and the silicon nitride film is subjected to patterning to form the passivation film 28. This passivation film 28 is formed to prevent occurrence of a malfunction of the TFT 2a caused by invasion of impurities such as an ion or a like in the semiconductor layer 27.

On the other hand, as shown in FIG. 12D, in the place where the external input terminal portion 2e is formed, the surface of the conductive layer 24a is exposed by opening.

Figure 11G:
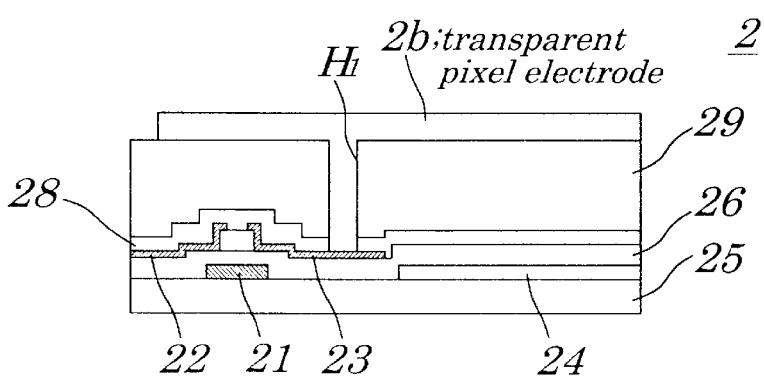

Next, as shown in FIG. 11G, the photosensitive, transparent, acryl polymer is subjected to patterning by the photolithography step to form the overcoat layer 29 on the passivation film 28.

Next, the passivation film 28 and the overcoat layer 29 are etched to expose the surface of the source electrode 23 in the predetermined place and the contact hole $H_1$ is formed and then, the ITO film is formed on the overcoat layer 29 by sputtering and patterned to form the transparent pixel electrode 2b.

On the other hand, the opposite substrate 4 is formed as follows.

First, black resist is patterned on the transparent insulation substrate 41 through the photolithography step to form the black matrix 42. Next, on the transparent insulation substrate 41, through the photolithography step of three times, a material, which is prepared by dispersing red (R), green (G), and blue (B) pigments using a photosensitive acryl polymer, is patterned to form the colored layer (color filter) 43.

Next, the ITO film is formed on the colored layer (color filter) 43 by sputtering as the opposite electrode 43, hereby forming the opposite substrate 4.

Next, on the TFT substrate 2 and the opposite substrate 4, which are formed by such steps, the liquid crystal orientating film 31 and 45 consisting of polyimide are formed.

Next, for example, to orient a nematic liquid crystal by twisting in a predetermined angle, rubbing treatment is carried out to rub the surface of the liquid crystal orientating film 31 of the TFT substrate 2 and the liquid crystal orientating film 45 of the opposite substrate 4 in a certain direction, a spacer comprised of polymer beads having a diameter corresponding to a space between the TFT substrate 2 and the opposite substrate 4 is dispersed on the entire surface, the TFT substrate 2 and the opposite substrate 4 are layered in the position of the liquid crystal orientating film 31 opposite to the liquid crystal orientating film 45 to adhere them, and the nematic liquid crystal, for example, is injected between the TFT substrate 2 and the opposite substrate 4 to complete the liquid crystal display panel 1.

Next, in the external input terminal portion 2e and the external input terminal portion 2f of this liquid crystal display panel 1, through the anisotropic conductive film, a TCP, on which the liquid crystal actuating IC, for example, has been formed, is heated and crimped to connect it, the TCP is connected to, for example, a PCB (Printed Circuit Board,) in which a signal processing circuit and a control system circuit are arranged, and a back light is assembled to manufacture the liquid crystal display device.

As described above, according to the configuration of this example, only one contact hole $H_1$ is formed, the source electrode 23 is only formed as an electrode layer immediately beneath this contact hole $H_1$, and the electrode layer does not overlap each other and therefore, even if the etchant penetrates the gate insulation film 26 in etching, no short between electrodes occurs.

On the other hand, preventive measures, for example, defining the distance predetermined between the signal line 2d and the transparent auxiliary capacitor-forming electrode 24, have been realized to prevent shorts between electrodes.

Consequently, the yield can be improved and the liquid crystal display panel of a high quality can be provided.

In addition, in the region where the transparent pixel electrode 2b has been formed, for example, there is no auxiliary capacitor common electrode to work as a light shield region and thus, an enough aperture ratio can be simultaneously kept and also, the transparent pixel electrode 2b and the transparent auxiliary capacitor-forming electrode 24, which occupies the region almost same as that of this the transparent pixel electrode 2b, comprise both the electrodes of the auxiliary capacitor and therefore, the electrode having a relatively large area allows keeping a relatively large capacitance.

Second Embodiment

Figure 13:
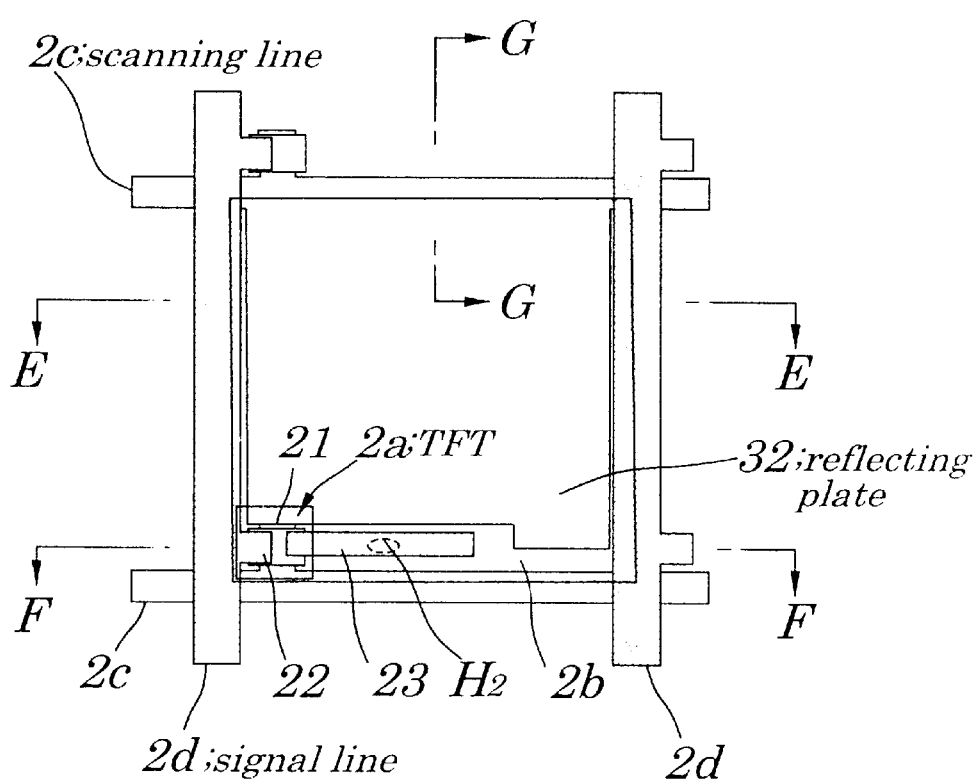
FIG. 13 is a plan view showing a configuration of one pixel of a TFT substrate of a liquid crystal display panel according to a second embodiment of the present invention.
Figure 14:
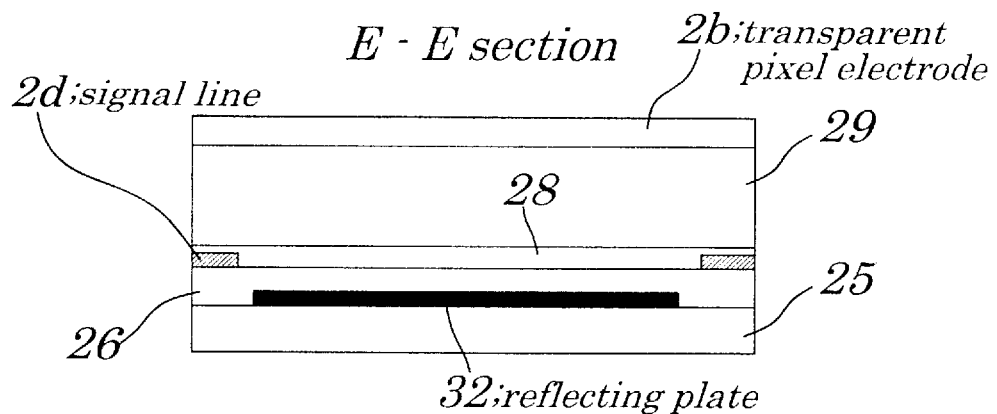
FIG. 14 is a sectional view along with a line E—E of FIG. 13.
Figure 15:
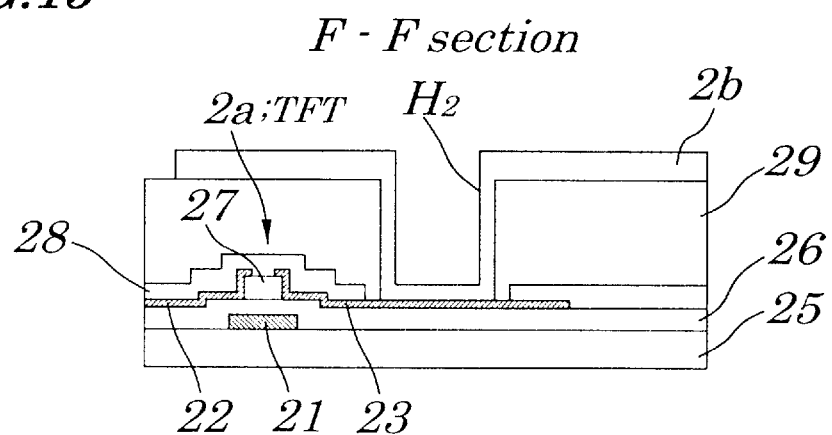
FIG. 15 is a sectional view along with a line F—F of FIG. 13.
Figure 16:
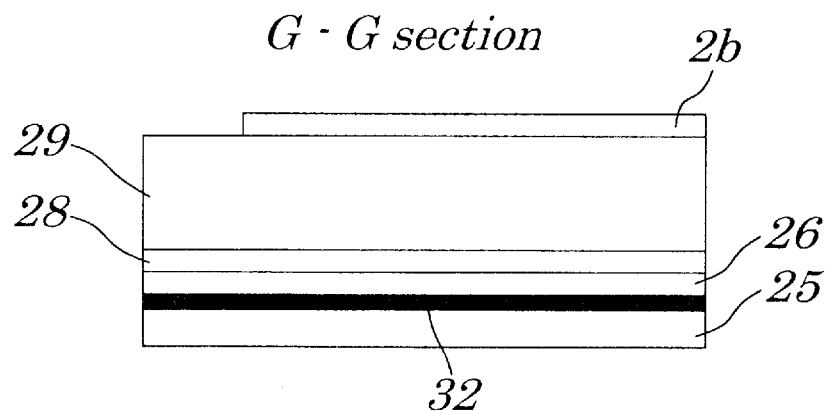
FIG. 16 is a sectional view along with a line G—G of FIG. 13.
Figure 17:
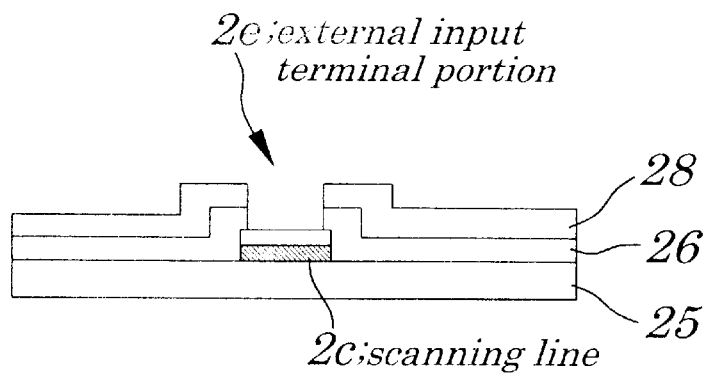
FIG. 17 is a transverse sectional view showing the configuration of the external input terminal portion for inputting the scanning signal of the liquid crystal display panel according to the second embodiment of the present invention.

FIG. 13 is the plan view showing the configuration of one pixel of a TFT substrate of a liquid crystal display panel according to a second embodiment of the present invention; FIG. 14 is a sectional view along with a line E—E of a FIG. 13; FIG. 15 is a sectional view along with a line F—F of FIG. 13; FIG. 16 is a sectional view along with a line G—G of FIG. 13; and FIG. 17 is the transverse sectional view showing a configuration of an external input terminal portion for inputting a scanning signal of the same liquid crystal display panel.

A different point of this example from the above described first embodiment is that a panel is reflective, a reflective plate 32 works also as the auxiliary capacitor-forming electrode and this reflective plate 32 is extended from a scanning line 2c of a preseding stage.

Other points are same as those of configuration described for the first embodiment and the description thereof will be briefly presented.

A TFT 2a is arranged around a place near a crossing part of the scanning line 2c with a signal line 2d and a source electrode 23 thereof is connected to the transparent pixel electrode 2b to be used as a switching device to apply a signal charge to corresponding liquid crystal cell. The TFT 2a is actuated and controlled by inputting the scanning signal in the gate electrode 21, to which the scanning line 2c is connected, through the scanning line 2c and also by inputting a display signal (data signal) in a drain electrode 22, to which the signal line 2d is connected.

The TFT substrate 2A of this example has the reflective plate 32 to reflect an incident light from a surface side, this reflective plate 32 is, as shown in FIG. 13, formed by extending from the immediately prior (preseding stage of) scanning line 2c of to the transparent pixel electrode 2b of this pixel, as it is.

The reflective plate 32 works also as a transparent auxiliary capacitor-forming electrode and constructs both electrodes of an auxiliary capacitor, together with the transparent pixel electrode 2b.

On the other hand, in a large part, the region where the reflective plate 32 is formed overlaps to the region where the transparent pixel electrode 2b is formed; both the regions have almost equal areas. In other words, the transparent pixel electrode 2b and the reflective plate 32 have the relatively large area and configure the auxiliary capacitor having a relatively large capacitance.

The source electrode 23 of the TFT substrate 2A is connected to the transparent pixel electrode 2b through a contact hole $H_2$. The contact hole $H_2$ is formed in outside of the region where the gate electrode 21 and the reflective plate 32 are formed.

In the TFT substrate 2A of this example, as shown in FIG. 13 to FIG. 16, the gate electrode 21 and the reflective plate 32 are formed in the same layer on a transparent insulation substrate 25, the gate electrode 21 and the reflective plate 32 are covered with a gate insulation film 26, the semiconductor layer 27 is formed on the gate insulation film 26 on the top of the gate electrode 21, the source electrode 23 and the drain electrode 22 are formed contacting with the semiconductor layer 27 on the gate insulation film 26; the gate insulation film 26, the semiconductor layer 27, the source electrode 23, and the drain electrode 22 are covered with a passivation film 28, an overcoat layer 29 is formed on the passivation film 28, and the overcoat layer 29 is covered with the transparent pixel electrode 2b.

In an external input terminal portion 2e, as sown in FIG. 17, a surface of the scanning line 2c consisting of aluminium or an aluminium alloy is exposed by making an opening of the gate insulation film 26 and the passivation film 28.

A TCP, on which a liquid crystal actuating IC, for example, has been formed, is connected to the scanning line 2c through an anisotropic conductive film or a like. Where, for aluminium or the aluminium alloy used as the material of the scanning line 2c, a contact resistance to the anisotropic conductive film can be relatively reduced in crimping.

On the other hand, in the external input terminal portion 2e, the surface of the signal line 2d consisting of aluminium or the aluminium alloy is exposed by making an opening of the gate insulation film 26 and the passivation film 28.

For preparation of the TFT substrate 2A of this example, first, a film of aluminium or its alloy is formed on the transparent insulation substrate 25 by sputtering, patterning is carried out by a lithographic technique to form the gate electrode 21 and the reflective plate 32 simultaneously. On the other hand, in this occasion, the scanning line (gate wire) 2c is simultaneously formed. Where, use of aluminium or its alloy is based on a relatively high reflectivity thereof.

Following steps of the method for manufacturing the liquid crystal display panel 1 are same as those of the above described first embodiment and description thereof will be omitted.

According to the constitution of this example, almost same effect as that described for the first embodiment can be yielded.

In addition, simultaneous formation of the gate electrode 21 and the reflective plate 32 in the same process and the work of the reflective plate 32 as the transparent auxiliary capacitor-forming electrode can simplify process steps and reduce a cost.

In addition, the scanning line 2c is formed by using aluminium or its alloy relatively high in plasticity and hence, in the external input terminal portion 2e, in comparison with a case using chromium, for example, as the material of the scanning line 2c, the contact resistance to the anisotropic conductive film can be reduced in crimping and a simple constitution can be realized having the exposed surface of the scanning line 2c.

Third Embodiment

Figure 18:
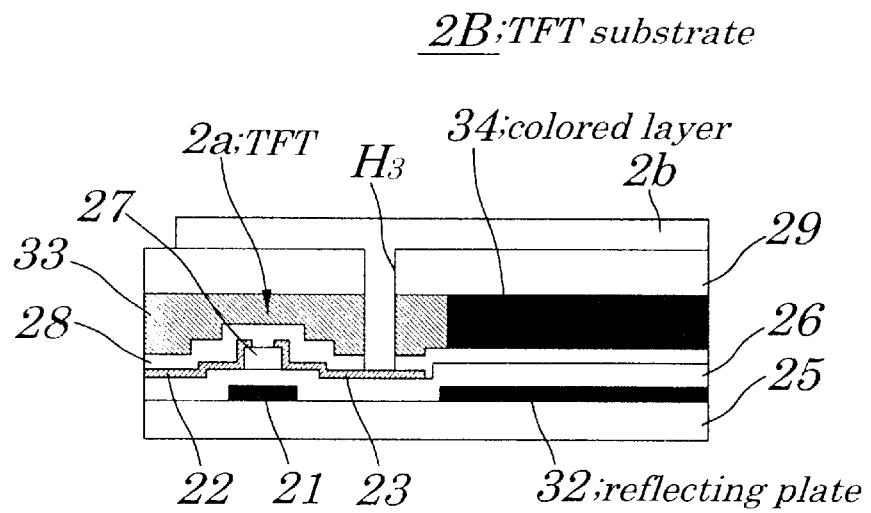
FIG. 18 is a sectional view showing a configuration of one pixel of a TFT substrate of a liquid crystal display panel according to a third embodiment of the present invention.

FIG. 18 is a sectional view showing a configuration of one pixel of a TFT substrate of a liquid crystal display panel according to the third embodiment of the present invention.

The different point of this example from the above described second embodiment is that in contrast to the second embodiment having a colored layer (color filter) in an opposite substrate, a TFT substrate has the colored layer. In accordance with this, the opposite substrate has no colored layer and black matrix.

Other points are almost same as those of configuration described for the second embodiment and therefore the description thereof will only be briefly presented.

A TFT substrate 2B of this example has a reflective plate 32, a colored layer (color filter) 34, and a black matrix 33. In the reflective plate 32, a transparent auxiliary capacitor forming electrode 24 (not shown) is formed extending from an immediately prior (preseding stage of) scanning line 2c (not shown) to a bottom of a transparent pixel electrode 2b of this pixel, as it is.

On the other hand, a source electrode 23 of a TFT 2a is connected to the transparent pixel electrode 2b through a contact hole $H_3$. The contact hole $H_3$ is formed outside of a region where a gate electrode 21 and the reflective plate 32 are formed.

In the TFT substrate 2B of this example, as shown in FIG. 18, the gate electrode 21 and the reflective plate 32 are formed in the same layer on a transparent insulation substrate 25, the gate electrode 21 and the reflective plate 32 are covered with a gate insulation film 26, a semiconductor layer 27 is formed on the gate insulation film 26 on the top of the gate electrode 21, the source electrode 23 and a drain electrode 22 are formed contacting with the semiconductor layer 27 on the gate insulation film 26; the gate insulation film 26, the semiconductor layer 27, the source electrode 23, and the drain electrode 22 are covered with a passivation film 28, the black matrix 33 is formed on the passivation film 28 to cover the TFT 2a, the colored layer (color filter) 34 is formed in the position corresponding to the reflective plate 32, an overcoat layer 29 is formed on the black matrix 33 and the colored layer 34, and the overcoat layer 29 is covered with the transparent pixel electrode 2b.

For reference, the black matrix 33 and the overcoat layer 29 may be formed when required and are not essential.

Next, a method for preparation of the TFT substrate 2 of the liquid crystal display panel of this example will be described below.

Aluminium film is formed on the transparent insulation substrate 25 by a sputtering method; patterning is carried out by employing a photolithographic technique to form the gate electrode 21 and the reflective plate 32.

Next, a silicon nitride film is formed on an entire surface to form the gate insulation film 26.

Subsequently, an a-Si film not doped and a $n^+$ type a-Si film are continuously formed and subjected to patterning to form the semiconductor layer 27.

Next, a chromium film is formed on the semiconductor layer 27 by the sputtering method and this chromium film is patterned to form the source electrode 23 and the drain electrode 22.

Next, by using a gas system for etching the n⁺ type a-Si, dry etching is carried out to remove n⁺ type a-Si between the source electrode 23 and the drain electrode 22.

Next, a silicon nitride film is formed and patterning of this silicon nitride film is carried out to form the passivation film 28.

Next, a black resist is patterned on the passivation film 28 to cover the TFT 2a through a photolithography step to form the black matrix 33.

Next, in a position adjacent to the black matrix 33 and corresponding to the reflective plate 32, through a photolithography step of three times, a material, which is prepared by dispersing red (R), green (G), and blue (B) pigments using a photosensitive acryl polymer, is patterned to form the colored layer 34.

Next, on the black matrix 33 and the colored layer 34, the transparent acryl polymer is patterned through the photolithography step to form the overcoat layer 29.

Next, to expose the surface of the source electrode 23 in a predetermined place, the passivation film 28, the black matrix 33, and the overcoat layer 29 are etched to form the contact hole $H_3$ and then, the ITO film is formed on the overcoat layer 29 by sputtering and patterned to form the transparent pixel electrode 2b.

With the constitution of this example, almost same effect as that described for the second embodiment can be yielded.

In addition, the colored layer (color filter) 34 is formed on the TFT substrate 2B and thus, the structure of an opposite substrate can be simplified and process steps thereof can be simplified.

As described above, the embodiments of the present invention have been described in detail with reference to the accompanying drawings. However, it is apparent that the present invention is not limited to the above embodiments but may be changed and modified without departing from the scope and spirit of the invention.

Figure 19:
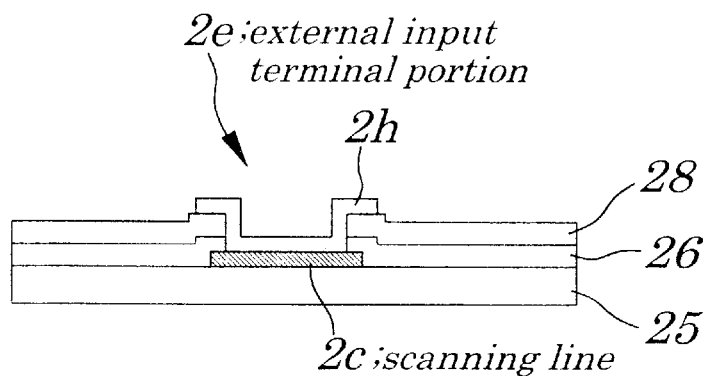
FIG. 19 is a transverse sectional view showing the configuration of an external input terminal portion for inputting the scanning signal of a modified example of the liquid crystal display panel according to the first embodiment.

For example, in the first embodiment described above, the case, where the conductive layer 24a is simultaneously formed in the step for forming the transparent auxiliary capacitor-forming electrode 24, has been described; however, as shown in FIG. 19, in the step for forming the transparent pixel electrode 2b, the conductive layer 2h may be formed using the ITO prepared by the same material as that of the transparent pixel electrode 2b. Also in this case, similar to the first embodiment, forming the uppermost conductive layer of contacting with the anisotropic conductive film by using the ITO allows the contact resistance to be suppressed to a low degree.

The external input terminal portion 2f may be the same constitution as that of the external input terminal portion 2e as shown in FIG. 8 by forming the chromium film in the step to form the scanning line 2c, the conductive layer 24a is formed on this chromium film and then, the gate insulation film 26 is formed and the contact hole $H_1$ is formed to connect electrically the above described chromium film to the signal line 2d.

Figure 20:
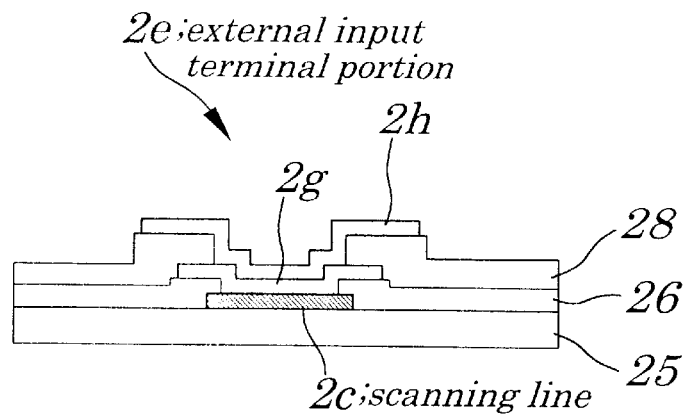
FIG. 20 is a transverse sectional view showing the configuration of an external input terminal portion for inputting the scanning signal of a modified example of the liquid crystal display panel according to the second embodiment.
Figure 21:
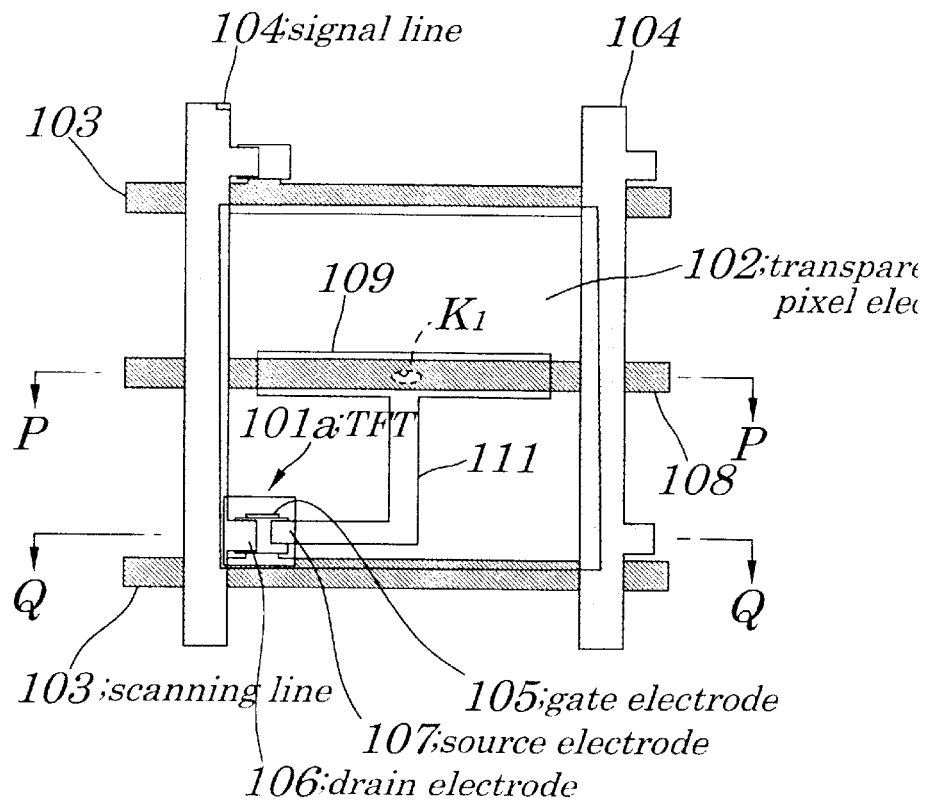
FIG. 21 is a plan view for explaining a conventional art.
Figure 22:
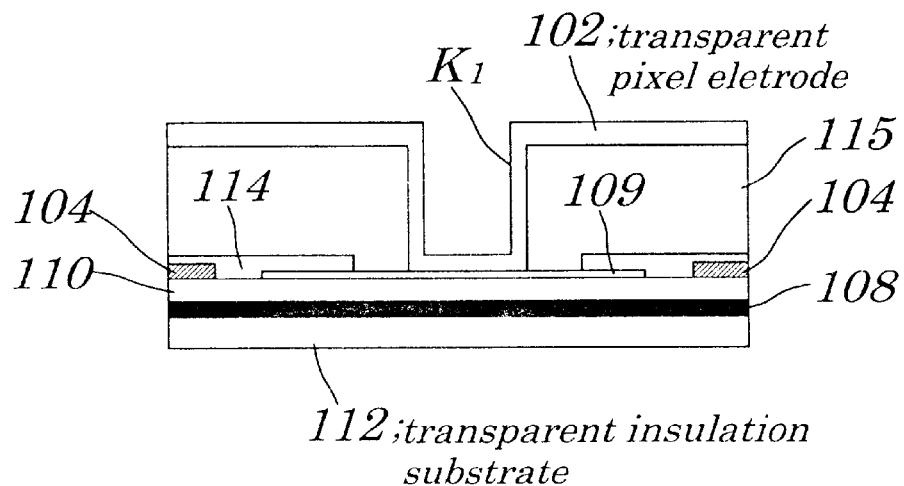
FIG. 22 is a sectional view for explaining the conventional art.
Figure 23:
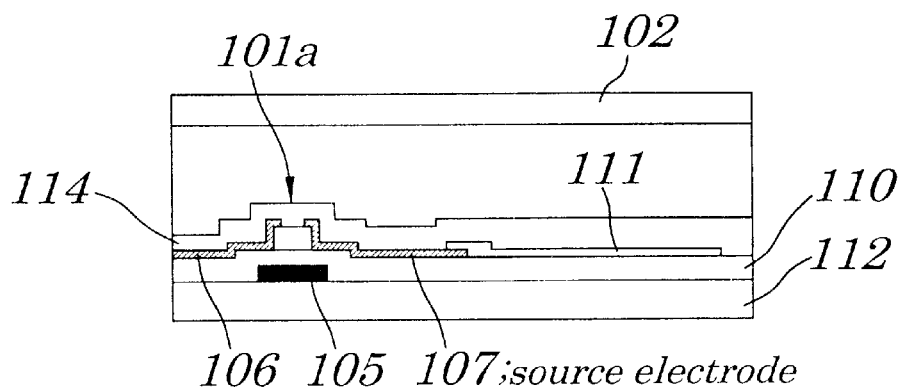
FIG. 23 is a sectional view for explaining the conventional art.
Figure 24A:
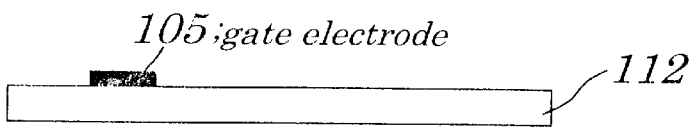
FIGS. 24A to 24F are process charts for explaining the conventional art.
Figure 24B:
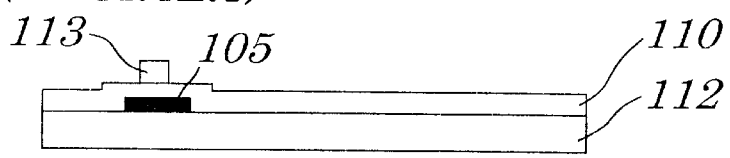
Figure 24C:
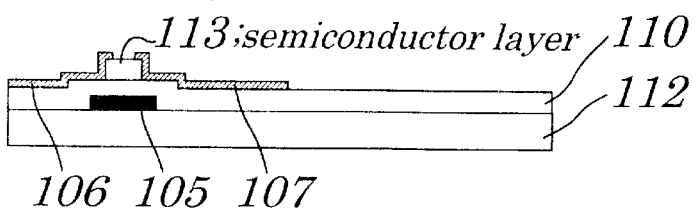
Figure 24D:
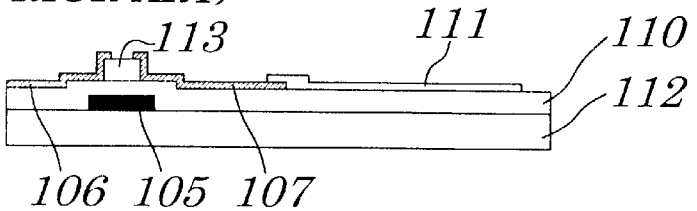
Figure 24E:
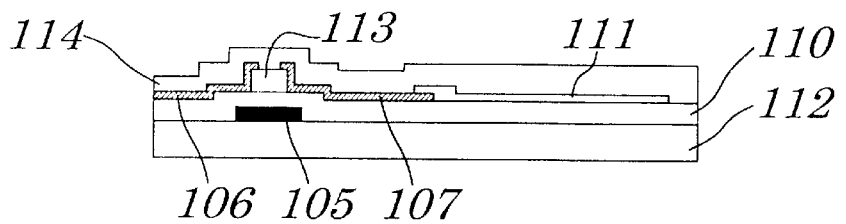
Figure 24F:
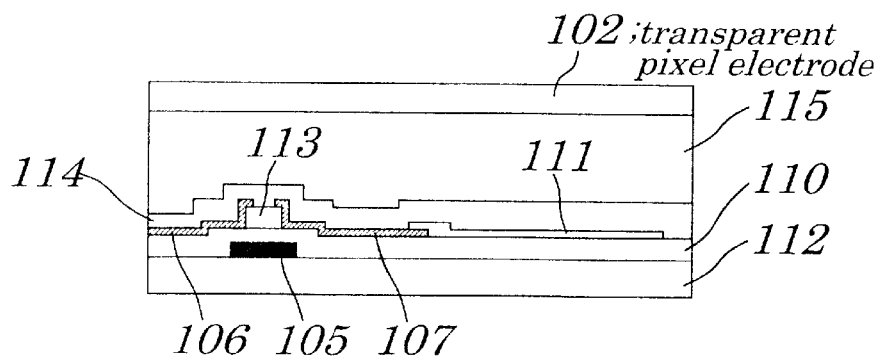
Figure 25:
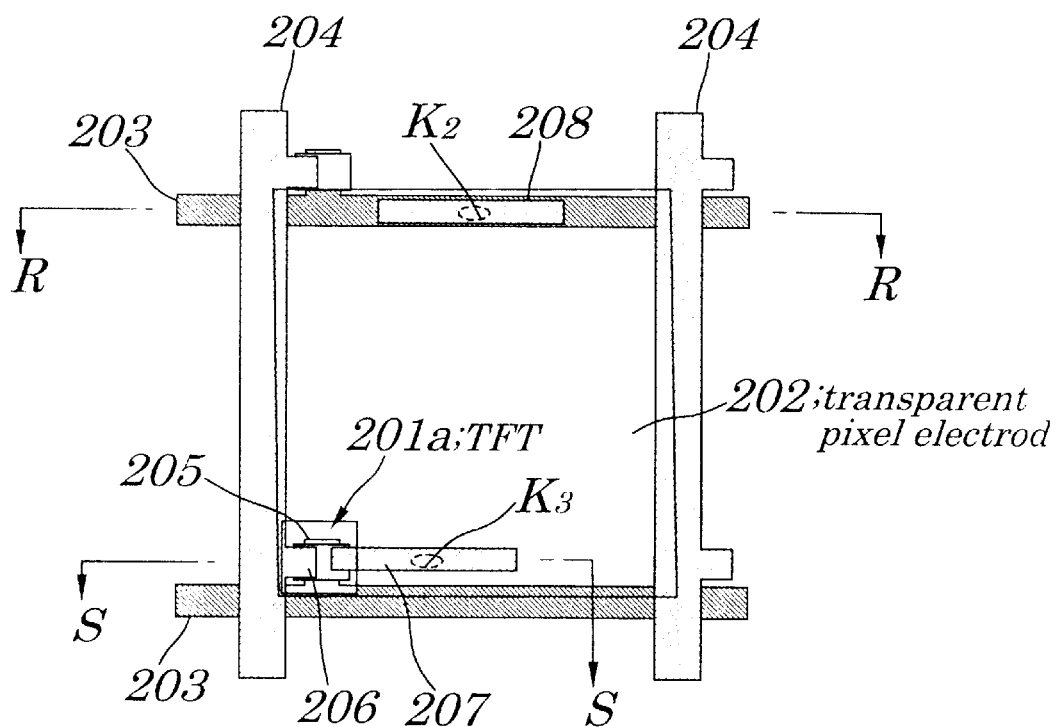
FIG. 25 is a plan view for explaining the conventional art.
Figure 26:
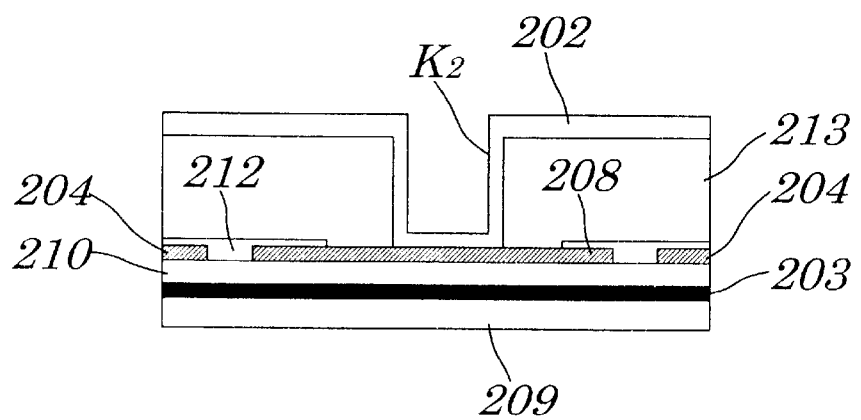
FIG. 26 is a sectional view for explaining the conventional art.
Figure 27:
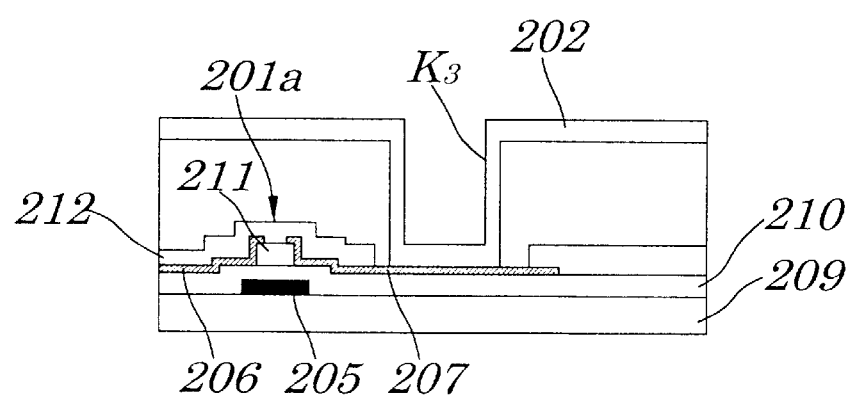
FIG. 27 is a sectional view for explaining the conventional art.
Figure 28A:
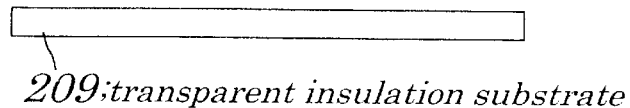
FIGS. 28A to 28F are process charts for explaining the conventional art.
Figure 28B:
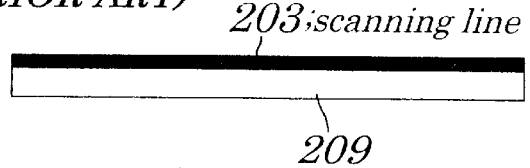
Figure 28C:
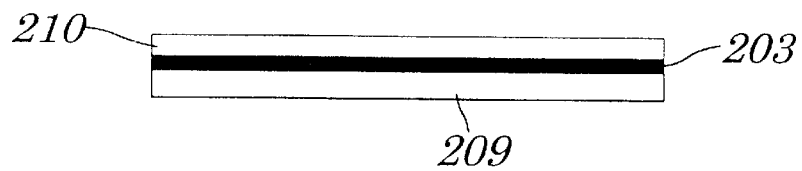
Figure 28D:
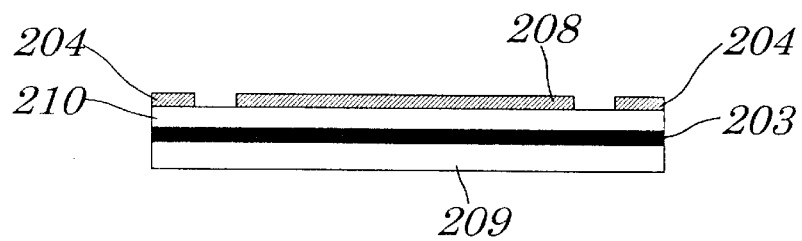
Figure 28E:
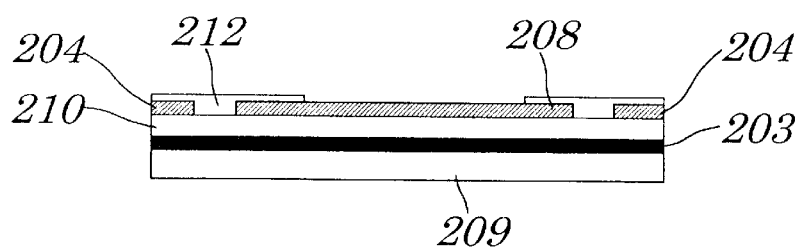
Figure 28F:
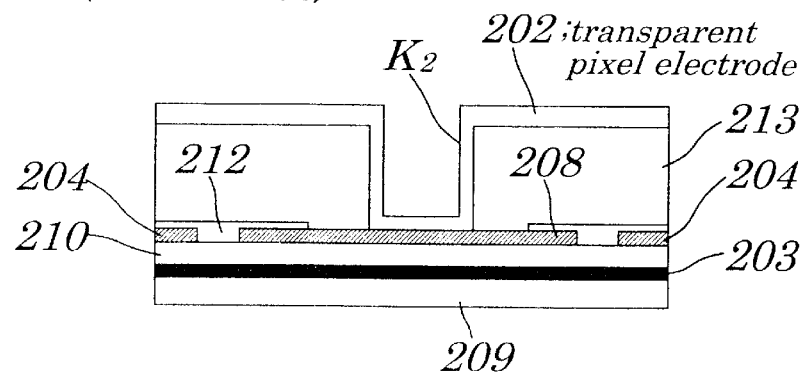
Figure 29A:
FIGS. 29A to 29F are process charts for explaining the conventional art.
Figure 29B:
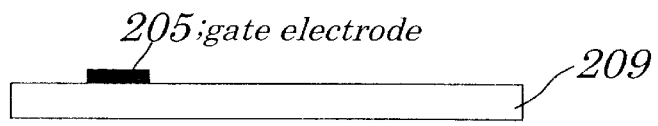
Figure 29C:
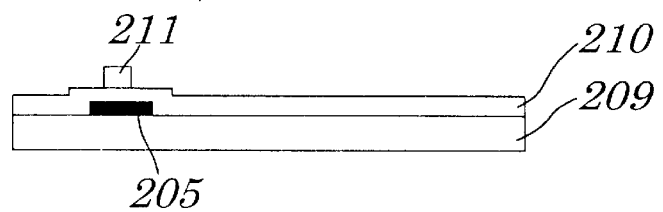
Figure 29D:
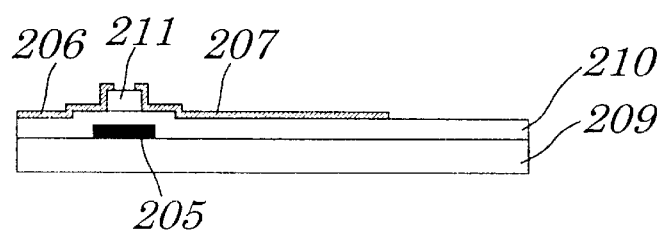
Figure 29E:
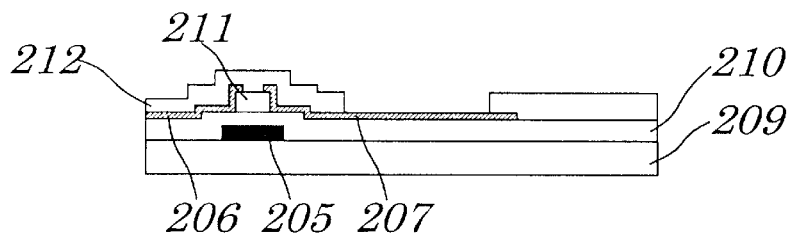
Figure 29F:
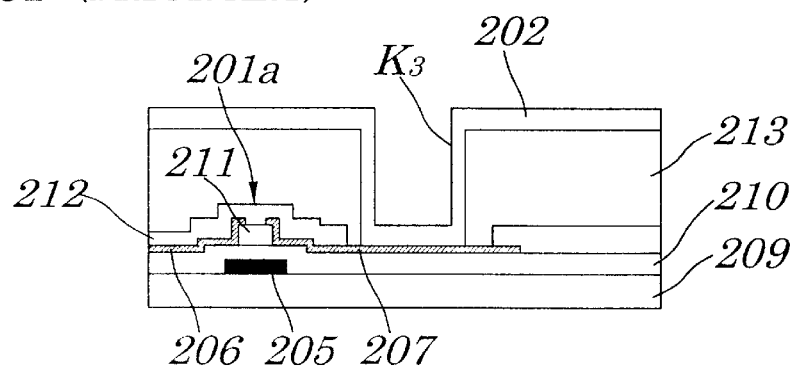
Figure 30:
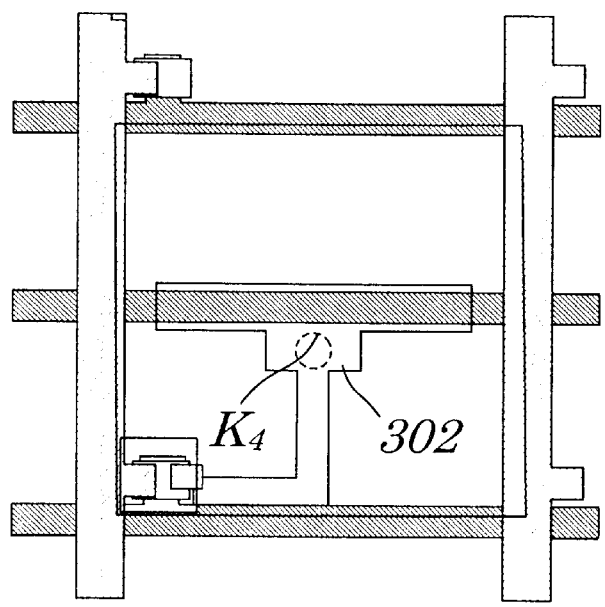
FIG. 30 is an explanatory view for explaining the conventional art.
Figure 31:
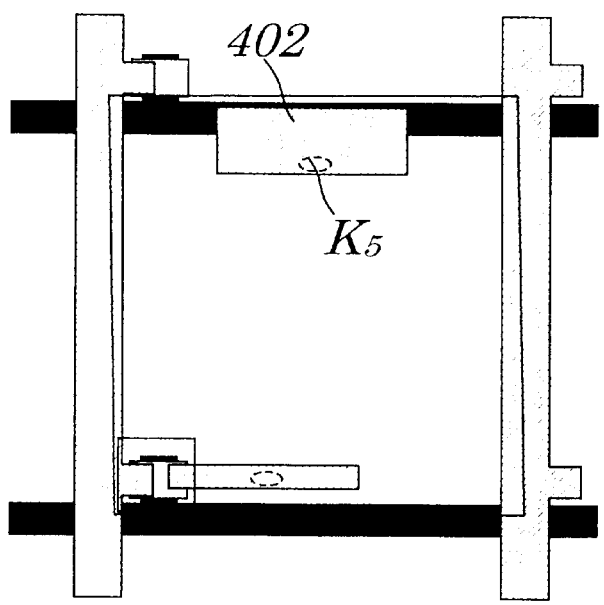
FIG. 31 is an explanatory view for explaining the conventional art.

On the other hand, in the second embodiment, it has been mentioned that in the external input terminal portion 2e and 2f, the anisotropic conductive film and the like is directly connected to the scanning line 2c consisting of aluminium or the aluminium alloy. However, as shown in FIG. 20, for example, the conductive layer 2h may be formed by using the ITO through the conductive layer 2g consisting of chromium to connect this conductive layer 2h directly to the anisotropic conductive film and the like. Even if the scanning line 2c is formed by using aluminium or the aluminium alloy, putting the chromium layer allows, for example, the uppermost conductive layer to be formed by using the ITO.

On the other hand, in the third embodiment, the case of the reflective type has been mentioned. However, the following constitution may be optional: in replacement to the reflective plate of the TFT substrate in which the colored layer (color filter) has been prepared, the transparent auxiliary capacitor-forming electrode may be arranged to use for the transmission type. Also in this case, the structure of the opposite substrate can be simplified and preparation steps thereof can be simplified.

It is apparent that the present invention is not limited to the above embodiments but may be changed and modified without departing from the scope and spirit of the invention.

What is claimed is:

1. A liquid crystal display device comprising:
    a scanning line to supply a scanning signal;
    a signal line to supply a display signal;
    a pixel electrode to apply a voltage to a liquid crystal layer;
    a switching device containing a first electrode formed on a place near a crossing part of said scanning line with said signal line and connected to said scanning line to become a gate, a second electrode connected to said signal line to become a drain or a source, a third electrode connected to said pixel electrode to become a source or a drain and switching said display signal to feed said corresponding pixel electrode by said scanning signal; and
    an electrode for an auxiliary capacitor, located in a place opposite to said pixel electrode to define the auxiliary capacitor;
    wherein in a same pixel, said second electrode and said third electrode are formed on a layer different from said first electrode through a first insulation film, said pixel electrode is formed on top of said first electrode, said second electrode, and said third electrode, and in a contact hole formed in a second insulation film, said electrode for said auxiliary capacitor, is formed in a same layer as said first electrode and is electrically connected to an adjacent said scanning line;
    wherein said signal line is located in a layer above said electrode for said auxiliary capacitor without overlapping said electrode forming said auxiliary capacitor.

2. The liquid crystal display device according to claim 1, wherein said electrode for said auxiliary capacitor is made of a transparent conductive material.

3. The liquid crystal display device according to claim 1, wherein said electrode for said auxiliary capacitor formed from the same material as that of said first electrode.

4. The liquid crystal display device according to claim 1, wherein said canning line and said signal line are formed of aluminum or an aluminum alloy and terminal portions said scanning line and said signal line are used as signal input terminals.

5. A method for manufacturing a liquid crystal display device, comprising:
    a first step of forming a scanning line, a first electrode, which becomes a gate by connecting to said scanning line, and an electrode for an auxiliary capacitor by patterning after making a conductive film on a transparent insulation substrate;
    a second step of forming an island-like semiconductor layer opposite to said first electrode through a first insulation film;

a third step of forming a signal line and also a second electrode to become a drain or source and a third electrode to become a source or drain which are connected to said signal line with a distance on said island-like semiconductor layer;

a fourth step of forming a second insulation film on a top of said island-like semiconductor layer, said second electrode, and said third electrode;

a fifth step of forming an opening on said second insulation film to reach said third electrode and form a pixel electrode connecting to said third electrode through said opening;

wherein said electrode for said auxiliary capacitor and said pixel electrode are overlaid or forming said auxiliary capacitor, wherein said signal line is not formed over said electrode for forming said auxiliary capacitor.

6. The method for manufacturing the liquid crystal display device according to claim 5, wherein in said first step, said first electrode and said electrode for said auxiliary capacitor are formed of a same kind of conductive material.

7. The method for manufacturing the liquid crystal display device according to claim 5, wherein said first step comprises a step of forming said first electrode of a conductive material and a step of forming said electrode for said auxiliary capacitor using a transparent conductive material.

8. The method for manufacturing the liquid crystal display device according to claim 5, wherein in said first step and said third step, said scanning line and said signal line are formed of aluminum or an aluminum alloy and a surface of said terminal portions of said scanning line and said signal line are exposed to make said signal input terminals.

9. A method for manufacturing a liquid crystal display device, comprising:

a first step of forming a scanning line, a first electrode, which becomes a gate by connecting to said scanning line, and an electrode for an auxiliary capacitor by patterning after making a conductive film on a transparent insulation substrate;

a second step of forming an island-like semiconductor layer opposite to said first electrode through a first insulation film;

a third step of forming a signal line and also a second electrode to become a drain or source and a third electrode to become a source or drain which are connected to said signal line with a distance on said island-like semiconductor layer;

a fourth step of forming a second insulation film on a top of said island-like semiconductor layer, said second electrode, and said third electrode;

a fifth step of forming an opening on said second insulation film to reach said third electrode and form a pixel electrode connecting to said third electrode through said opening, wherein said first step comprises a step of forming said first electrode of a conductive material and a step of forming said electrode for said auxiliary capacitor using a transparent conductive material, and wherein in said first step, after formation of said scanning line, said electrode for said auxiliary capacitor is formed of said transparent conductive material and also a terminal portion of said scanning line is covered with said conductive film using said transparent conductive material, hereby forming a signal input terminal.

10. A method for manufacturing a liquid crystal display device, comprising:

a first step of forming a scanning line, a first electrode, which becomes a gate by connecting to said scanning line, and an electrode for an auxiliary capacitor by patterning after making a conductive film on a transparent insulation substrate;

a second step of forming an island-like semiconductor layer opposite to said first electrode through a first insulation film;

a third step of forming a signal line and also a second electrode to become a drain or source and a third electrode to become a source or drain which are connected to said signal line with a distance on said island-like semiconductor layer;

a fourth step of forming a second insulation film on a top of said island-like semiconductor layer, said second electrode, and said third electrode;

a fifth step of forming an opening on said second insulation film to reach said third electrode and form a pixel electrode connecting to said third electrode through said opening, wherein said first step comprises a step of forming said first electrode of a conductive material and a step of forming said electrode for said auxiliary capacitor using a transparent conductive material, and wherein in said first step, said electrode for said auxiliary capacitor is formed of said transparent conductive material and also said conductive film is formed in a region, where said signal line is formed of said transparent conductive material;

in said third step, in said terminal portion, said signal line is formed to connect to said conductive film to form said signal input terminal.

* * * * *

UNITED STATES PATENT AND TRADEMARK OFFICE
CERTIFICATE OF CORRECTION

PATENT NO. : 6,667,777 B1 Page 1 of 1
DATED : December 23, 2003
INVENTOR(S) : Kikkawa et al.

It is certified that error appears in the above-identified patent and that said Letters Patent is hereby corrected as shown below:

Column 16,
Line 54, "canning" should be -- scanning --.

Signed and Sealed this

Twenty-fourth Day of February, 2004

JON W. DUDAS
*Acting Director of the United States Patent and Trademark Office*